United States Patent
Tung et al.

(10) Patent No.: US 9,110,281 B2
(45) Date of Patent: Aug. 18, 2015

(54) VERTICALLY ETCHED FACETS FOR DISPLAY DEVICES

(71) Applicants: Ming-Hau Tung, San Francisco, CA (US); Srinivasan Kodaganallur Ganapathi, Palo Alto, CA (US)

(72) Inventors: Ming-Hau Tung, San Francisco, CA (US); Srinivasan Kodaganallur Ganapathi, Palo Alto, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 348 days.

(21) Appl. No.: 13/624,530

(22) Filed: Sep. 21, 2012

(65) Prior Publication Data

US 2013/0162657 A1    Jun. 27, 2013

Related U.S. Application Data

(60) Provisional application No. 61/579,554, filed on Dec. 22, 2011.

(51) Int. Cl.
| | |
|---|---|
| G02B 26/00 | (2006.01) |
| G02F 1/19 | (2006.01) |
| G06F 15/00 | (2006.01) |
| G02B 5/08 | (2006.01) |
| G06F 3/044 | (2006.01) |

(52) U.S. Cl.
CPC ............... *G02B 26/001* (2013.01); *G02B 5/08* (2013.01); *G02F 1/19* (2013.01); *G06F 3/044* (2013.01); *G06F 15/00* (2013.01)

(58) Field of Classification Search
CPC ........ G02B 26/001; G02B 5/003; G02B 5/08; G06F 15/00; G03F 1/24
USPC ......... 359/242, 290–291, 577–578, 584–585, 359/838–839, 846; 216/13, 24; 430/4–5
See application file for complete search history.

(56) References Cited

U.S. PATENT DOCUMENTS

| | | | |
|---|---|---|---|
| 6,864,112 B1 | 3/2005 | Harle | |
| 7,598,174 B1 | 10/2009 | Zhuang | |
| 7,813,029 B2 | 10/2010 | Kothari et al. | |
| 7,857,982 B2 | 12/2010 | Abatchev et al. | |
| 7,903,316 B2 | 3/2011 | Kothari et al. | |
| 7,982,215 B2 | 7/2011 | Inoue et al. | |
| 2009/0246647 A1* | 10/2009 | Hashimoto et al. | 430/5 |
| 2009/0257105 A1* | 10/2009 | Xu et al. | 359/242 |
| 2010/0302218 A1 | 12/2010 | Bita et al. | |
| 2011/0157058 A1 | 6/2011 | Bita et al. | |
| 2012/0120682 A1* | 5/2012 | Sasagawa et al. | 362/624 |

OTHER PUBLICATIONS

International Search Report and Written Opinion—PCT/US2012/069875—ISA/EPO—May 10, 2013.
Partial International Search Report—PCT/US2012/069875—ISA/EPO—Mar. 6, 2013.

* cited by examiner

*Primary Examiner* — James Phan
(74) *Attorney, Agent, or Firm* — Knobbe Martens Olson & Bear LLP

(57) ABSTRACT

This disclosure provides systems, methods and apparatus for masked reflective structures which can be integrated into display devices. In one aspect, masks and etch leading layers can be used to control the etching of a stack of layers to form masked reflective structures having a desired profile. In particular, tapered edges at a particular angle can be formed, and the resulting structures used in a roll-to-roll process to fabricate a device component.

23 Claims, 17 Drawing Sheets

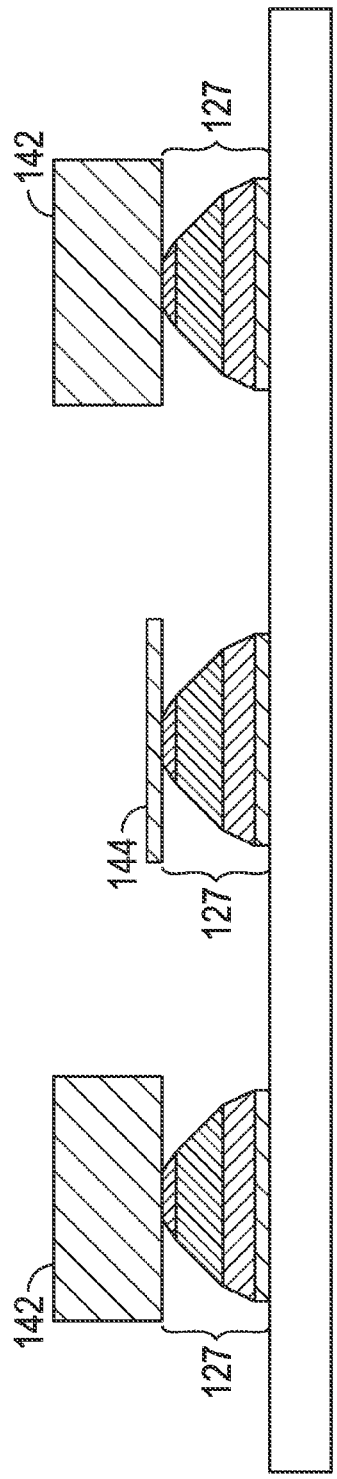
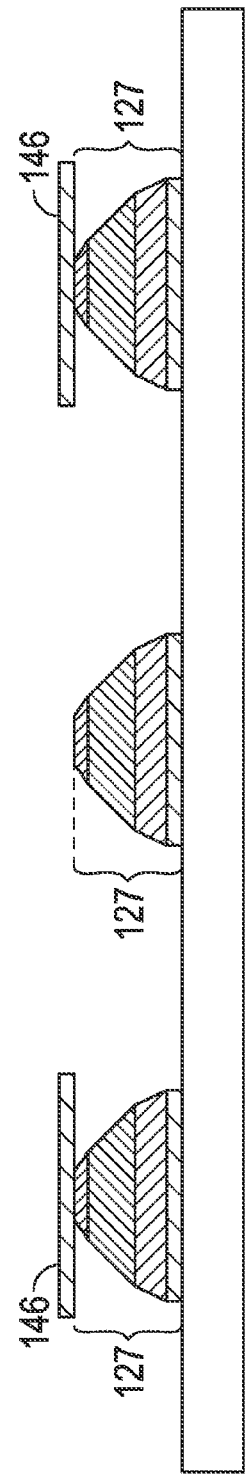

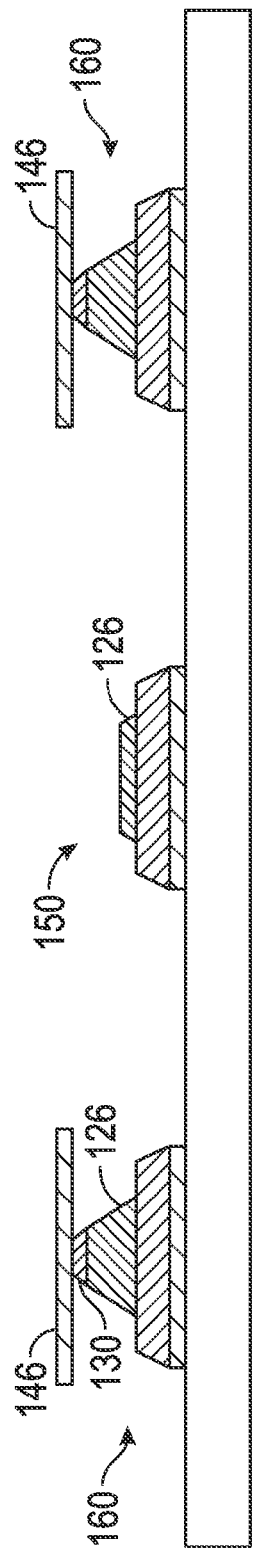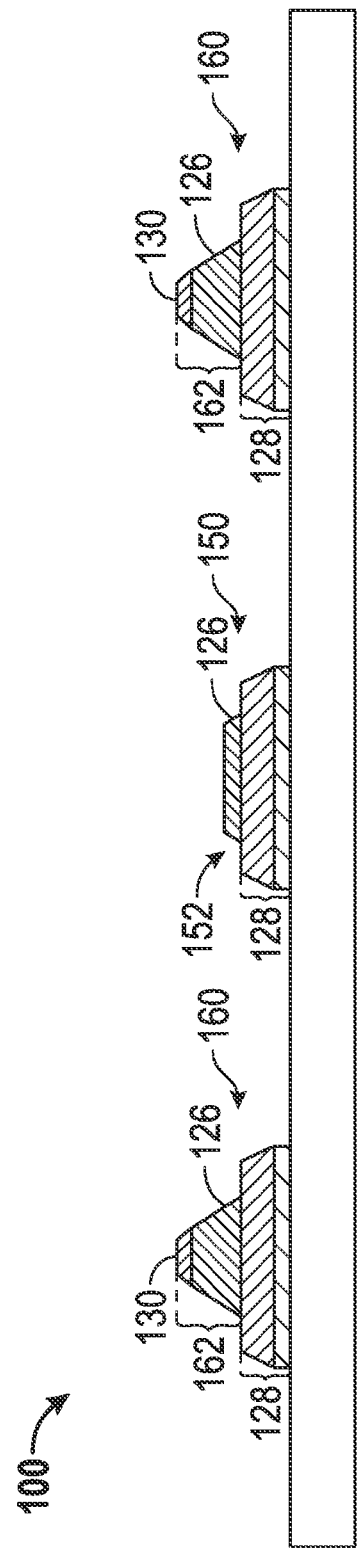

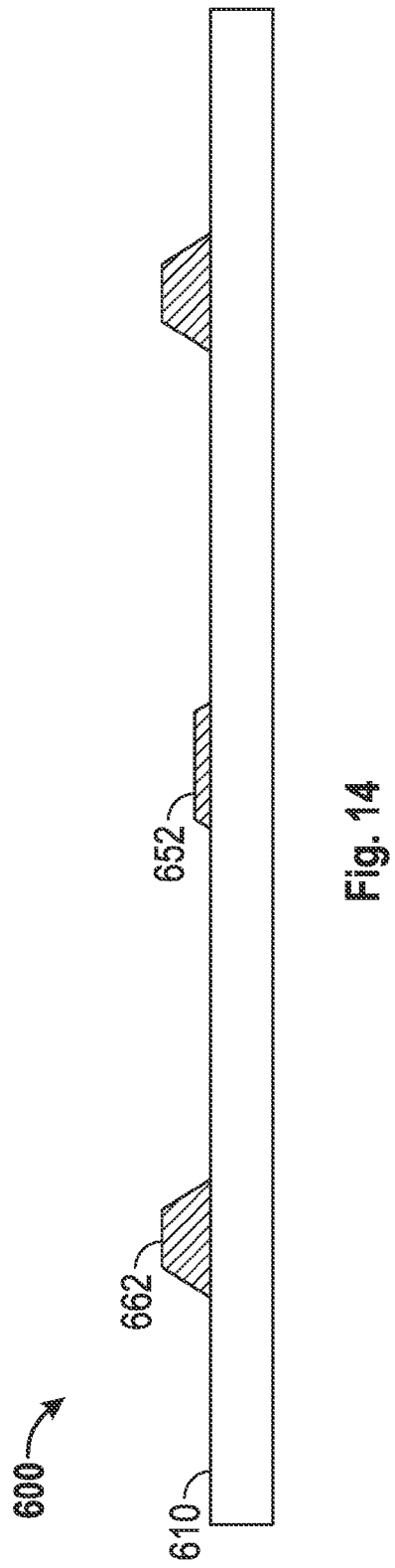

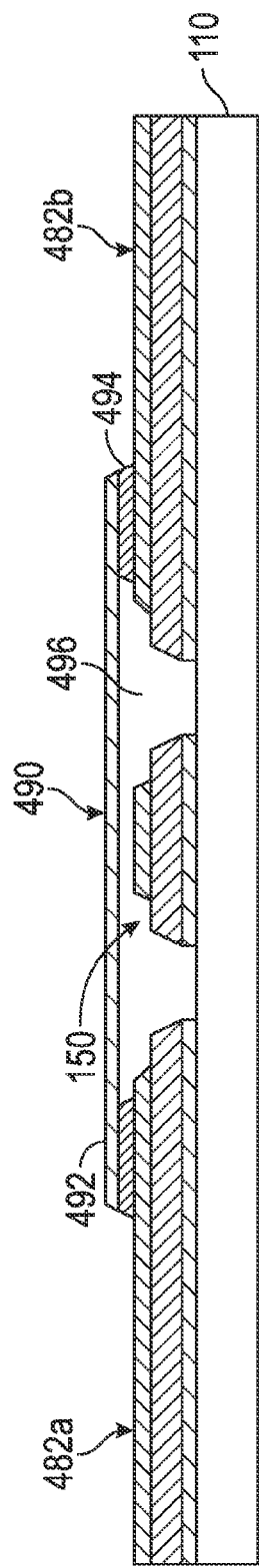

US 9,110,281 B2

VERTICALLY ETCHED FACETS FOR DISPLAY DEVICES

CROSS-REFERENCE TO RELATED APPLICATIONS

This patent application claims priority to U.S. Provisional Patent Application No. 61/579,554, filed Dec. 22, 2011 entitled "ANGLED FACETS FOR DISPLAY DEVICES," and assigned to the assignee hereof. The disclosure of the prior application is considered part of and is incorporated by reference in this patent application.

TECHNICAL FIELD

This disclosure relates to methods of forming masked structures for use in electromechanical systems (EMS) devices.

DESCRIPTION OF THE RELATED TECHNOLOGY

Electromechanical systems include devices having electrical and mechanical elements, actuators, transducers, sensors, optical components (e.g., minors) and electronics. Electromechanical systems can be manufactured at a variety of scales including, but not limited to, microscales and nanoscales. For example, microelectromechanical systems (MEMS) devices can include structures having sizes ranging from about a micron to hundreds of microns or more. Nanoelectromechanical systems (NEMS) devices can include structures having sizes smaller than a micron including, for example, sizes smaller than several hundred nanometers. Electromechanical elements may be created using deposition, etching, lithography, and/or other micromachining processes that etch away parts of substrates and/or deposited material layers, or that add layers to form electrical and electromechanical devices.

One type of electromechanical systems device is called an interferometric modulator (IMOD). As used herein, the term interferometric modulator or interferometric light modulator refers to a device that selectively absorbs and/or reflects light using the principles of optical interference. In some implementations, an interferometric modulator may include a pair of conductive plates, one or both of which may be transparent and/or reflective, wholly or in part, and capable of relative motion upon application of an appropriate electrical signal. In an implementation, one plate may include a stationary layer deposited on a substrate and the other plate may include a reflective membrane separated from the stationary layer by an air gap. The position of one plate in relation to another can change the optical interference of light incident on the interferometric modulator. Interferometric modulator devices have a wide range of applications, and are anticipated to be used in improving existing products and creating new products, especially those with display capabilities.

Display devices can include complimentary structures formed between the viewer and the display. For example, frontlight systems may include an array of reflective facets configured to redirect light propagating within a frontlight guiding film towards a reflective display. Similarly, touchscreen input systems, such as capacitive touchscreen input systems, may include a crisscrossing array of sensor wiring which forms a capacitive grid.

In addition, because both frontlight systems and touchscreen systems may include components which are at least opaque, and usually reflective, a masking structure may be provided between the touchscreen or frontlight components and the viewer, in order to shield the components from view, preventing undesirable optical effects which may occur as a result of reflection of light from these components towards a viewer.

SUMMARY

The systems, methods and devices of the disclosure each have several innovative aspects, no single one of which is solely responsible for the desirable attributes disclosed herein.

One innovative aspect of the subject matter described in this disclosure can be implemented in an apparatus, including a substrate having a first surface, at least one reflective facet formed over the first surface of the substrate, the reflective facet including a reflective layer having a side tapered at an angle to the first surface of the substrate, and at least one electrode formed over the first surface of the substrate, where the electrode includes a conductive layer, the reflective layer of the reflective facet and the conductive layer including at least one common material, where a thickness of the conductive layer of the electrode is less than a thickness of the reflective layer of the electrode.

In one aspect, the reflective facet can include a first masking structure disposed between the reflective layer and the first surface of the substrate, and the electrode can include a second masking structure disposed between the conductive layer and the first surface of the substrate. In a further aspect, the masking structures of the reflective facet and the electrode can each include an absorber layer, and a spacer layer, where the absorber layers and the spacer layers form interferometric black masks in conjunction with the reflective layer and the conductive layer, respectively.

In one aspect, the reflective facet can include an etch leading layer disposed on the side of the reflective layer opposite the first surface of the substrate, where the etch leading layer is selectively etchable with respect to the reflective layer at a greater rate than the reflective layer. In one aspect, the substrate can include glass. In one aspect, the substrate can include a flexible material.

In one aspect, the apparatus can additionally include a second electrode electrically isolated from the first electrode and extending generally orthogonally to the first electrode. In a further aspect, the first and second electrode can form a part of a capacitive touch sensing system.

In one aspect, the apparatus can additionally include a light guiding layer positioned adjacent the substrate, where the light guiding layer includes a first surface abutting the first surface of the substrate, where the at least one reflective facet extends beyond a plane of the first surface of the light guiding layer. In a further aspect, the apparatus can additionally include a light source in optical communication with the light guiding layer and configured to emit light into the light guiding layer, where the reflective facet is configured to direct the emitted light out of the light guiding layer. In a further aspect, the apparatus can additionally include a display disposed on the opposite side of the light guiding layer as the substrate.

Another innovative aspect of the subject matter described in this disclosure can be implemented in a method of fabricating an apparatus, including forming a reflective layer over a substrate, forming a masking layer over the reflective layer, patterning the masking layer to form a first masking structure and a second masking structure, where the first masking structure is thicker than the second masking structure, etching the reflective layer using a first etch to form portions of the reflective layer located under each of the first and second masking structures, etching the first and second masking structures using a second etch, where the second etch removes the second masking structure without removing the first masking structure, and etching the reflective layer using a third etch to form a reflective facet and an electrode, where the reflective facet is thicker than the electrode.

In one aspect, the method can additionally include forming an etch leading layer over the reflective layer and prior to forming the masking layer, where the third etch etches the etch leading layer at a greater rate than the reflective layer. In one aspect, the method can additionally include forming an absorber layer over the substrate and a spacer layer over the absorber layer, where the reflective layer is formed over the absorber layer.

In one aspect, the first masking structure and the second masking structure can be laterally displaced from one another. In one aspect, the first masking structure and the second masking structure can be located so that they are not in contact with one another.

Another innovative aspect of the subject matter described in this disclosure can be implemented in a device, including a reflective layer formed over a substrate, an etch leading layer formed over the reflective layer, a first masking structure formed over the etch leading layer, and a second masking structure formed over the etch leading layer, where the second masking structure is separated from and laterally displaced from the first masking structure, and where the second masking structure has a thickness which is less than a thickness of the first masking structure.

In one aspect, the device can additionally include a masking layer formed between the reflective layer and the substrate. In a further aspect, the masking layer can include an optical absorber sublayer, and a spacer sublayer disposed between the optical absorber sublayer and the reflective layer. In another further aspect, the masking layer can include an opaque layer. In one aspect, the etch leading layer can be etchable by an etchant at a first rate, and the reflective layer can be etchable by the same etchant at a second rate, where the first rate is greater than the second rate.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIGS. 9A-9F show an example of a process for forming masked structures on a substrate.

FIG. 14 shows an example of a structure formed by the process of FIG. 13.

FIG. 16A shows an example of another implementation of a substrate having two sets of masked wiring formed thereon.

Like reference numbers and designations in the various drawings indicate like elements.

DETAILED DESCRIPTION

Figure 1:
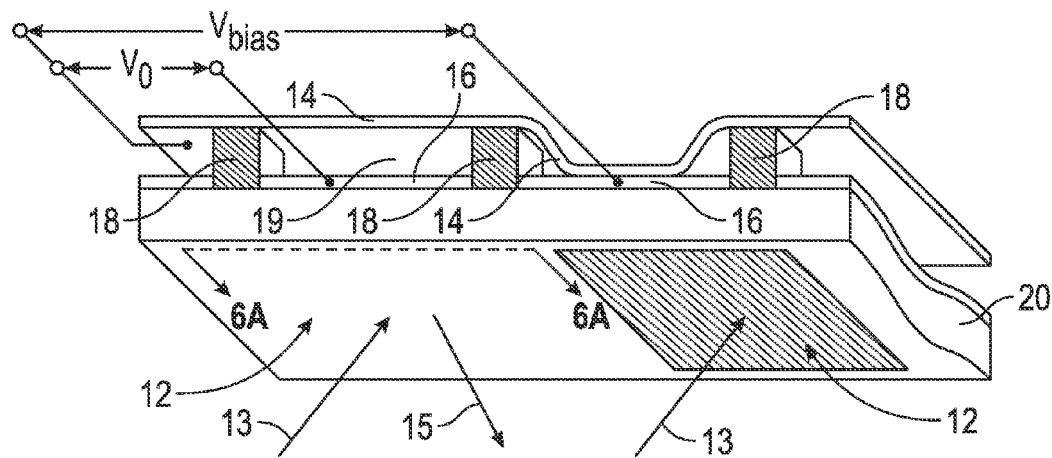
FIG. 1 shows an example of an isometric view depicting two adjacent pixels in a series of pixels of an interferometric modulator (IMOD) display device.

The following detailed description is directed to certain implementations for the purposes of describing the innovative aspects. However, the teachings herein can be applied in a multitude of different ways. The described implementations may be implemented in any device that is configured to display an image, whether in motion (e.g., video) or stationary (e.g., still image), and whether textual, graphical or pictorial. More particularly, it is contemplated that the implementations may be implemented in or associated with a variety of electronic devices such as, but not limited to, mobile telephones, multimedia Internet enabled cellular telephones, mobile television receivers, wireless devices, smartphones, Bluetooth® devices, personal data assistants (PDAs), wireless electronic mail receivers, hand-held or portable computers, netbooks, notebooks, smartbooks, tablets, printers, copiers, scanners, facsimile devices, GPS receivers/navigators, cameras, MP3 players, camcorders, game consoles, wrist watches, clocks, calculators, television monitors, flat panel displays, electronic reading devices (e.g., e-readers), computer monitors, auto displays (e.g., odometer display, etc.), cockpit controls and/or displays, camera view displays (e.g., display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (e.g., MEMS and non-MEMS), aesthetic structures (e.g., display of images on a piece of jewelry) and a variety of electromechanical systems devices. The teachings herein also can be used in non-display applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes, and electronic test equipment. Thus, the teachings are not intended to be limited to the implementations depicted solely in the Figures, but instead have wide applicability as will be readily apparent to a person having ordinary skill in the art.

Because precise alignment may not be required between a frontlight or touchscreen component and the elements of a display device, these complimentary system components (e.g., reflective facets and wiring) may be fabricated separately from the display device and then adhered or otherwise secured to the display device. For example, masks of various thicknesses can be used to define both wiring and reflective facets on a single substrate. In some implementations, masks of different thicknesses can be formed by various techniques, such as different exposure, embossing, or imprinting. When used in conjunction with etch leading layers, the angle of the reflective facet can be controlled. By selectively removing only some of the masks during the fabrication process, components of varying thickness can be formed from a single reflective layer.

Particular implementations of the subject matter described in this disclosure can be implemented to realize one or more of the following potential advantages. In certain implementations, fabrication of these components on flexible substrates allows the frontlight or touchscreen components to be secured to a display device in a roll-to-roll process, which can result in a reduction in the cost and speed of fabrication of these systems. Because of the lower profile of the wiring, the wiring can extend at least partially into a light-guiding layer without significantly impacting the propagation of light within the layer. By including components for multiple complimentary systems on a single substrate, the overall height of a display device including both a frontlight system and a touchscreen system can be reduced. The use of flexible substrates instead of rigid glass substrates allows the use of thinner, more lightweight substrate materials, and corresponding benefits to devices incorporating these substrates. By utilizing a single mask to form masking structures of two different heights, the total number of masks can be reduced, lowering the manufacturing cost of these devices.

An example of a suitable MEMS device, to which the described implementations may apply, is a reflective display device. Reflective display devices can incorporate interferometric modulators (IMODs) to selectively absorb and/or reflect light incident thereon using principles of optical interference. IMODs can include an absorber, a reflector that is movable with respect to the absorber, and an optical resonant cavity defined between the absorber and the reflector. The reflector can be moved to two or more different positions, which can change the size of the optical resonant cavity and thereby affect the reflectance of the interferometric modulator. The reflectance spectrums of IMODs can create fairly broad spectral bands which can be shifted across the visible wavelengths to generate different colors. The position of the spectral band can be adjusted by changing the thickness of the optical resonant cavity, i.e., by changing the position of the reflector.

FIG. 1 shows an example of an isometric view depicting two adjacent pixels in a series of pixels of an interferometric modulator (IMOD) display device. The IMOD display device includes one or more interferometric MEMS display elements. In these devices, the pixels of the MEMS display elements can be in either a bright or dark state. In the bright ("relaxed," "open" or "on") state, the display element reflects a large portion of incident visible light, e.g., to a user. Conversely, in the dark ("actuated," "closed" or "off") state, the display element reflects little incident visible light. In some implementations, the light reflectance properties of the on and off states may be reversed. MEMS pixels can be configured to reflect predominantly at particular wavelengths allowing for a color display in addition to black and white.

The IMOD display device can include a row/column array of IMODs. Each IMOD can include a pair of reflective layers, i.e., a movable reflective layer and a fixed partially reflective layer, positioned at a variable and controllable distance from each other to form an air gap (also referred to as an optical gap or cavity). The movable reflective layer may be moved between at least two positions. In a first position, i.e., a relaxed position, the movable reflective layer can be positioned at a relatively large distance from the fixed partially reflective layer. In a second position, i.e., an actuated position, the movable reflective layer can be positioned more closely to the partially reflective layer. Incident light that reflects from the two layers can interfere constructively or destructively depending on the position of the movable reflective layer, producing either an overall reflective or non-reflective state for each pixel. In some implementations, the IMOD may be in a reflective state when unactuated, reflecting light within the visible spectrum, and may be in a dark state when actuated, reflecting light outside of the visible range (e.g., infrared light). In some other implementations, however, an IMOD may be in a dark state when unactuated, and in a reflective state when actuated. In some implementations, the introduction of an applied voltage can drive the pixels to change states. In some other implementations, an applied charge can drive the pixels to change states.

The depicted portion of the pixel array in FIG. 1 includes two adjacent interferometric modulators 12. In the IMOD 12 on the left (as illustrated), a movable reflective layer 14 is illustrated in a relaxed position at a predetermined distance from an optical stack 16, which includes a partially reflective layer. The voltage $V_0$ applied across the IMOD 12 on the left is insufficient to cause actuation of the movable reflective layer 14. In the IMOD 12 on the right, the movable reflective layer 14 is illustrated in an actuated position near or adjacent the optical stack 16. The voltage $V_{bias}$ applied across the IMOD 12 on the right is sufficient to maintain the movable reflective layer 14 in the actuated position.

In FIG. 1, the reflective properties of pixels 12 are generally illustrated with arrows indicating light 13 incident upon the pixels 12, and light 15 reflecting from the pixel 12 on the left. Although not illustrated in detail, it will be understood by a person having ordinary skill in the art that most of the light 13 incident upon the pixels 12 will be transmitted through the transparent substrate 20, toward the optical stack 16. A portion of the light incident upon the optical stack 16 will be transmitted through the partially reflective layer of the optical stack 16, and a portion will be reflected back through the transparent substrate 20. The portion of light 13 that is transmitted through the optical stack 16 will be reflected at the movable reflective layer 14, back toward (and through) the transparent substrate 20. Interference (constructive or destructive) between the light reflected from the partially reflective layer of the optical stack 16 and the light reflected from the movable reflective layer 14 will determine the wavelength(s) of light 15 reflected from the pixel 12.

The optical stack 16 can include a single layer or several layers. The layer(s) can include one or more of an electrode layer, a partially reflective and partially transmissive layer and a transparent dielectric layer. In some implementations, the optical stack 16 is electrically conductive, partially transparent and partially reflective, and may be fabricated, for example, by depositing one or more of the above layers onto a transparent substrate 20. The electrode layer can be formed from a variety of materials, such as various metals, for example indium tin oxide (ITO). The partially reflective layer can be formed from a variety of materials that are partially reflective, such as various metals, e.g., chromium (Cr), semiconductors, and dielectrics. The partially reflective layer can be formed of one or more layers of materials, and each of the layers can be formed of a single material or a combination of materials. In some implementations, the optical stack 16 can include a single semi-transparent thickness of metal or semiconductor which serves as both an optical absorber and conductor, while different, more conductive layers or portions (e.g., of the optical stack 16 or of other structures of the IMOD) can serve to bus signals between IMOD pixels. The optical stack 16 also can include one or more insulating or dielectric layers covering one or more conductive layers or a conductive/absorptive layer.

In some implementations, the layer(s) of the optical stack 16 can be patterned into parallel strips, and may form row electrodes in a display device as described further below. As will be understood by one having skill in the art, the term "patterned" is used herein to refer to masking as well as etching processes. In some implementations, a highly conductive and reflective material, such as aluminum (Al), may be used for the movable reflective layer 14, and these strips may form column electrodes in a display device. The movable reflective layer 14 may be formed as a series of parallel strips of a deposited metal layer or layers (orthogonal to the row electrodes of the optical stack 16) to form columns deposited on top of posts 18 and an intervening sacrificial material deposited between the posts 18. When the sacrificial material is etched away, a defined gap 19, or optical cavity, can be formed between the movable reflective layer 14 and the optical stack 16. In some implementations, the spacing between posts 18 may be approximately 1-1000 um, while the gap 19 may be less than 10,000 Angstroms (Å).

In some implementations, each pixel of the IMOD, whether in the actuated or relaxed state, is essentially a capacitor formed by the fixed and moving reflective layers. When no voltage is applied, the movable reflective layer 14 remains in a mechanically relaxed state, as illustrated by the pixel 12 on the left in FIG. 1, with the gap 19 between the movable reflective layer 14 and optical stack 16. However, when a potential difference, e.g., voltage, is applied to at least one of a selected row and column, the capacitor formed at the intersection of the row and column electrodes at the corresponding pixel becomes charged, and electrostatic forces pull the electrodes together. If the applied voltage exceeds a threshold, the movable reflective layer 14 can deform and move near or against the optical stack 16. A dielectric layer (not shown) within the optical stack 16 may prevent shorting and control the separation distance between the layers 14 and 16, as illustrated by the actuated pixel 12 on the right in FIG. 1. The behavior is the same regardless of the polarity of the applied potential difference. Though a series of pixels in an array may be referred to in some instances as "rows" or "columns," a person having ordinary skill in the art will readily understand that referring to one direction as a "row" and another as a "column" is arbitrary. Restated, in some orientations, the rows can be considered columns, and the columns considered to be rows. Furthermore, the display elements may be evenly arranged in orthogonal rows and columns (an "array"), or arranged in non-linear configurations, for example, having certain positional offsets with respect to one another (a "mosaic"). The terms "array" and "mosaic" may refer to either configuration. Thus, although the display is referred to as including an "array" or "mosaic," the elements themselves need not be arranged orthogonally to one another, or disposed in an even distribution, in any instance, but may include arrangements having asymmetric shapes and unevenly distributed elements.

Figure 2:
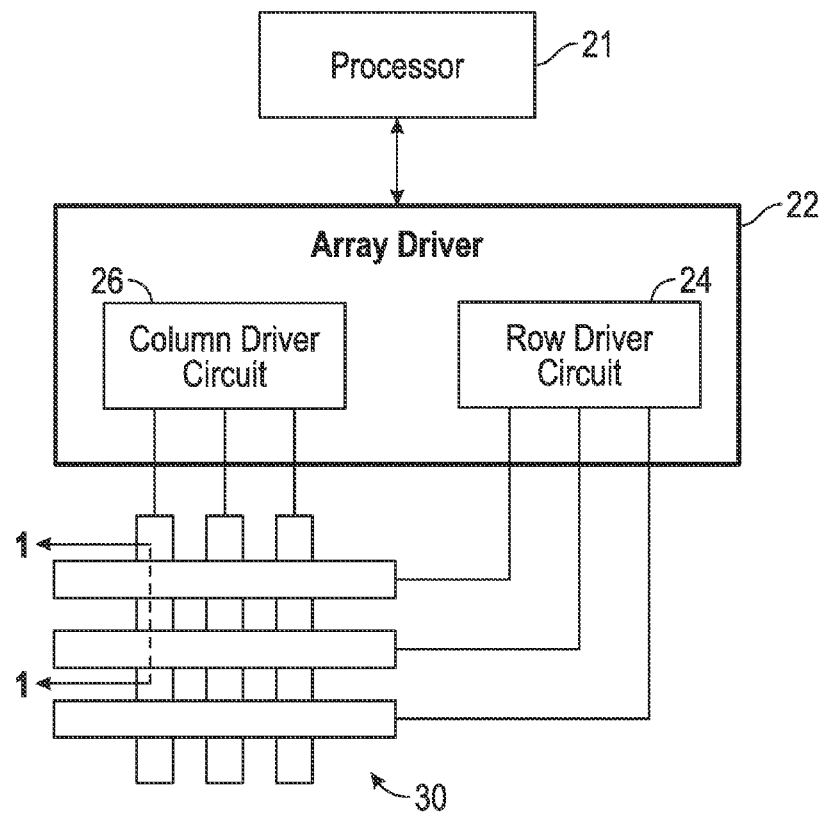
FIG. 2 shows an example of a system block diagram illustrating an electronic device incorporating a 3×3 interferometric modulator display.

FIG. 2 shows an example of a system block diagram illustrating an electronic device incorporating a 3×3 interferometric modulator display. The electronic device includes a processor 21 that may be configured to execute one or more software modules. In addition to executing an operating system, the processor 21 may be configured to execute one or more software applications, including a web browser, a telephone application, an email program, or any other software application.

The processor 21 can be configured to communicate with an array driver 22. The array driver 22 can include a row driver circuit 24 and a column driver circuit 26 that provide signals to, e.g., a display array or panel 30. The cross section of the IMOD display device illustrated in FIG. 1 is shown by the lines 1-1 in FIG. 2. Although FIG. 2 illustrates a 3×3 array of IMODs for the sake of clarity, the display array 30 may contain a very large number of IMODs, and may have a different number of IMODs in rows than in columns, and vice versa.

Figures 3, 4:
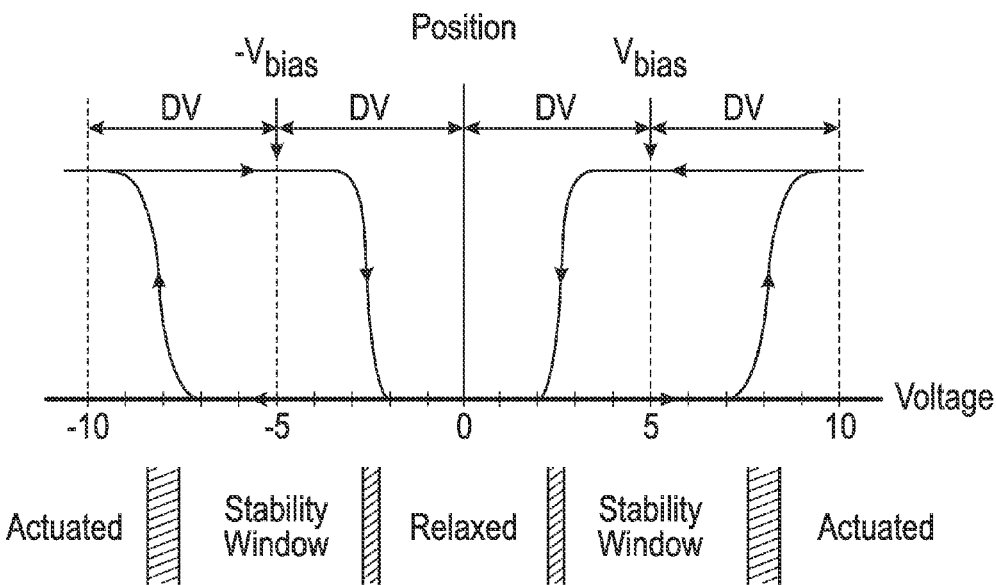
FIG. 3 shows an example of a diagram illustrating movable reflective layer position versus applied voltage for the interferometric modulator of FIG. 1.
FIG. 4 shows an example of a table illustrating various states of an interferometric modulator when various common and segment voltages are applied.

FIG. 3 shows an example of a diagram illustrating movable reflective layer position versus applied voltage for the interferometric modulator of FIG. 1. For MEMS interferometric modulators, the row/column (i.e., common/segment) write procedure may take advantage of a hysteresis property of these devices as illustrated in FIG. 3. An interferometric modulator may require, for example, about a 10-volt potential difference to cause the movable reflective layer, or mirror, to change from the relaxed state to the actuated state. When the voltage is reduced from that value, the movable reflective layer maintains its state as the voltage drops back below, e.g., 10-volts, however, the movable reflective layer does not relax completely until the voltage drops below 2-volts. Thus, a range of voltage, approximately 3 to 7-volts, as shown in FIG. 3, exists where there is a window of applied voltage within which the device is stable in either the relaxed or actuated state. This is referred to herein as the "hysteresis window" or "stability window." For a display array 30 having the hysteresis characteristics of FIG. 3, the row/column write procedure can be designed to address one or more rows at a time, such that during the addressing of a given row, pixels in the addressed row that are to be actuated are exposed to a voltage difference of about 10-volts, and pixels that are to be relaxed are exposed to a voltage difference of near zero volts. After addressing, the pixels are exposed to a steady state or bias voltage difference of approximately 5-volts such that they remain in the previous strobing state. In this example, after being addressed, each pixel sees a potential difference within the "stability window" of about 3-7-volts. This hysteresis property feature enables the pixel design, e.g., illustrated in FIG. 1, to remain stable in either an actuated or relaxed pre-existing state under the same applied voltage conditions. Since each IMOD pixel, whether in the actuated or relaxed state, is essentially a capacitor formed by the fixed and moving reflective layers, this stable state can be held at a steady voltage within the hysteresis window without substantially consuming or losing power. Moreover, essentially little or no current flows into the IMOD pixel if the applied voltage potential remains substantially fixed.

In some implementations, a frame of an image may be created by applying data signals in the form of "segment" voltages along the set of column electrodes, in accordance with the desired change (if any) to the state of the pixels in a given row. Each row of the array can be addressed in turn, such that the frame is written one row at a time. To write the desired data to the pixels in a first row, segment voltages corresponding to the desired state of the pixels in the first row can be applied on the column electrodes, and a first row pulse in the form of a specific "common" voltage or signal can be applied to the first row electrode. The set of segment voltages can then be changed to correspond to the desired change (if any) to the state of the pixels in the second row, and a second common voltage can be applied to the second row electrode. In some implementations, the pixels in the first row are unaffected by the change in the segment voltages applied along the column electrodes, and remain in the state they were set to during the first common voltage row pulse. This process may be repeated for the entire series of rows, or alternatively, columns, in a sequential fashion to produce the image frame. The frames can be refreshed and/or updated with new image data by continually repeating this process at some desired number of frames per second.

The combination of segment and common signals applied across each pixel (that is, the potential difference across each pixel) determines the resulting state of each pixel. FIG. 4 shows an example of a table illustrating various states of an interferometric modulator when various common and segment voltages are applied. As will be readily understood by one having ordinary skill in the art, the "segment" voltages can be applied to either the column electrodes or the row electrodes, and the "common" voltages can be applied to the other of the column electrodes or the row electrodes.

As illustrated in FIG. 4 (as well as in the timing diagram shown in FIG. 5B), when a release voltage $VC_{REL}$ is applied along a common line, all interferometric modulator elements along the common line will be placed in a relaxed state, alternatively referred to as a released or unactuated state, regardless of the voltage applied along the segment lines, i.e., high segment voltage $VS_H$ and low segment voltage $VS_L$. In particular, when the release voltage $VC_{REL}$ is applied along a common line, the potential voltage across the modulator (alternatively referred to as a pixel voltage) is within the relaxation window (see FIG. 3, also referred to as a release window) both when the high segment voltage $VS_H$ and the low segment voltage $VS_L$ are applied along the corresponding segment line for that pixel.

When a hold voltage is applied on a common line, such as a high hold voltage $VC_{HOLD\_H}$ or a low hold voltage $VC_{HOLD\_L}$, the state of the interferometric modulator will remain constant. For example, a relaxed IMOD will remain in a relaxed position, and an actuated IMOD will remain in an actuated position. The hold voltages can be selected such that the pixel voltage will remain within a stability window both when the high segment voltage $VS_H$ and the low segment voltage $VS_L$ are applied along the corresponding segment line. Thus, the segment voltage swing, i.e., the difference between the high $VS_H$ and low segment voltage $VS_L$, is less than the width of either the positive or the negative stability window.

When an addressing, or actuation, voltage is applied on a common line, such as a high addressing voltage $VC_{ADD\_H}$ or a low addressing voltage $VC_{ADD\_L}$, data can be selectively written to the modulators along that line by application of segment voltages along the respective segment lines. The segment voltages may be selected such that actuation is dependent upon the segment voltage applied. When an addressing voltage is applied along a common line, application of one segment voltage will result in a pixel voltage within a stability window, causing the pixel to remain unactuated. In contrast, application of the other segment voltage will result in a pixel voltage beyond the stability window, resulting in actuation of the pixel. The particular segment voltage which causes actuation can vary depending upon which addressing voltage is used. In some implementations, when the high addressing voltage $VC_{ADD\_H}$ is applied along the common line, application of the high segment voltage $VS_H$ can cause a modulator to remain in its current position, while application of the low segment voltage $VS_L$ can cause actuation of the modulator. As a corollary, the effect of the segment voltages can be the opposite when a low addressing voltage $VC_{ADD\_HL}$ is applied, with high segment voltage $VS_H$ causing actuation of the modulator, and low segment voltage $VS_L$ having no effect (i.e., remaining stable) on the state of the modulator.

In some implementations, hold voltages, address voltages, and segment voltages may be used which always produce the same polarity potential difference across the modulators. In some other implementations, signals can be used which alternate the polarity of the potential difference of the modulators. Alternation of the polarity across the modulators (that is, alternation of the polarity of write procedures) may reduce or inhibit charge accumulation which could occur after repeated write operations of a single polarity.

Figure 5A:
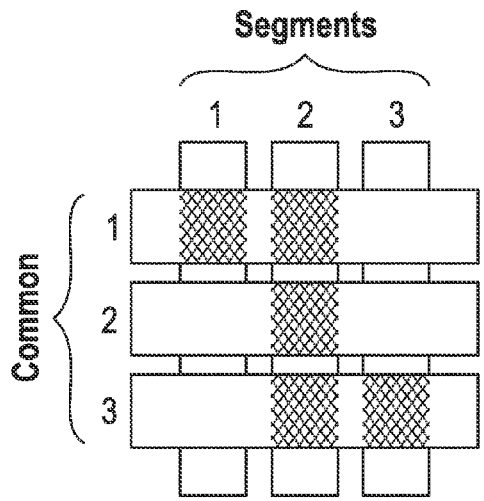
FIG. 5A shows an example of a diagram illustrating a frame of display data in the 3×3 interferometric modulator display of FIG. 2.
Figure 5B:
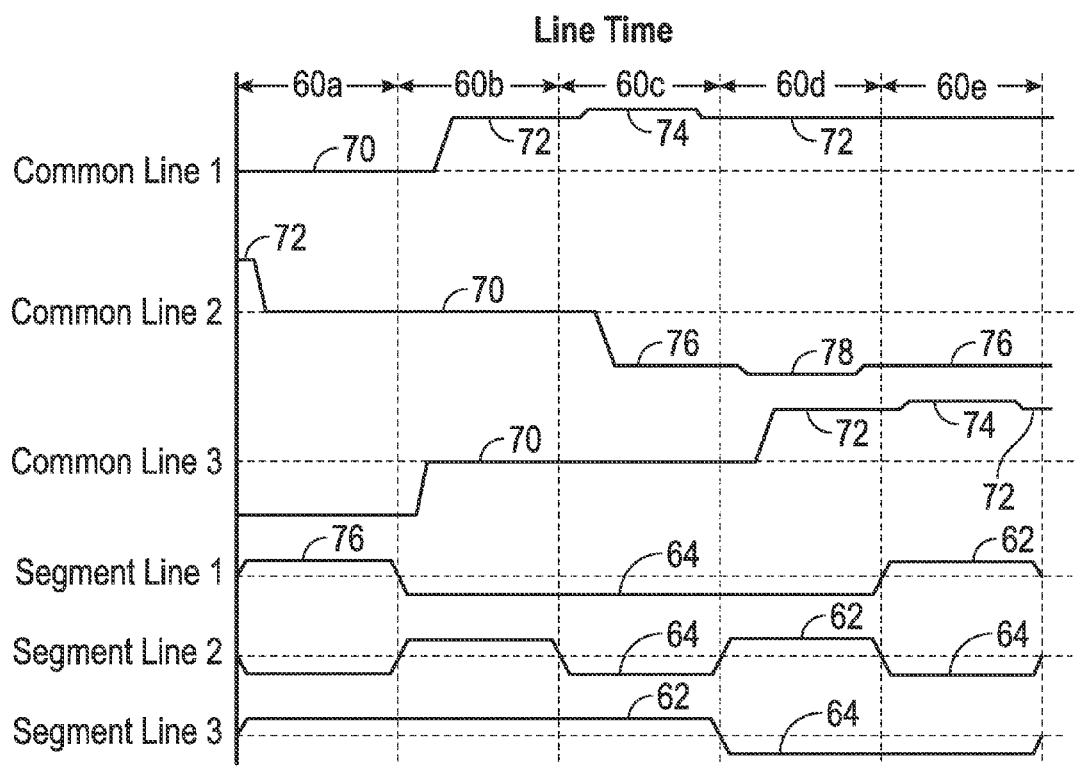
FIG. 5B shows an example of a timing diagram for common and segment signals that may be used to write the frame of display data illustrated in FIG. 5A.

FIG. 5A shows an example of a diagram illustrating a frame of display data in the 3×3 interferometric modulator display of FIG. 2. FIG. 5B shows an example of a timing diagram for common and segment signals that may be used to write the frame of display data illustrated in FIG. 5A. The signals can be applied to the, e.g., 3×3 array of FIG. 2, which will ultimately result in the line time 60e display arrangement illustrated in FIG. 5A. The actuated modulators in FIG. 5A are in a dark-state, i.e., where a substantial portion of the reflected light is outside of the visible spectrum so as to result in a dark appearance to, e.g., a viewer. Prior to writing the frame illustrated in FIG. 5A, the pixels can be in any state, but the write procedure illustrated in the timing diagram of FIG. 5B presumes that each modulator has been released and resides in an unactuated state before the first line time 60a.

During the first line time 60a: a release voltage 70 is applied on common line 1; the voltage applied on common line 2 begins at a high hold voltage 72 and moves to a release voltage 70; and a low hold voltage 76 is applied along common line 3. Thus, the modulators (common 1, segment 1), (1,2) and (1,3) along common line 1 remain in a relaxed, or unactuated, state for the duration of the first line time 60a, the modulators (2,1), (2,2) and (2,3) along common line 2 will move to a relaxed state, and the modulators (3,1), (3,2) and (3,3) along common line 3 will remain in their previous state. With reference to FIG. 4, the segment voltages applied along segment lines 1, 2 and 3 will have no effect on the state of the interferometric modulators, as none of common lines 1, 2 or 3 are being exposed to voltage levels causing actuation during line time 60a (i.e., $VC_{REL}$—relax and $VC_{HOLD\_L}$—stable).

During the second line time 60b, the voltage on common line 1 moves to a high hold voltage 72, and all modulators along common line 1 remain in a relaxed state regardless of the segment voltage applied because no addressing, or actuation, voltage was applied on the common line 1. The modulators along common line 2 remain in a relaxed state due to the application of the release voltage 70, and the modulators (3,1), (3,2) and (3,3) along common line 3 will relax when the voltage along common line 3 moves to a release voltage 70.

During the third line time 60c, common line 1 is addressed by applying a high address voltage 74 on common line 1. Because a low segment voltage 64 is applied along segment lines 1 and 2 during the application of this address voltage, the pixel voltage across modulators (1,1) and (1,2) is greater than the high end of the positive stability window (i.e., the voltage differential exceeded a predefined threshold) of the modulators, and the modulators (1,1) and (1,2) are actuated. Conversely, because a high segment voltage 62 is applied along segment line 3, the pixel voltage across modulator (1,3) is less than that of modulators (1,1) and (1,2), and remains within the positive stability window of the modulator; modulator (1,3) thus remains relaxed. Also during line time 60c, the voltage along common line 2 decreases to a low hold voltage 76, and the voltage along common line 3 remains at a release voltage 70, leaving the modulators along common lines 2 and 3 in a relaxed position.

During the fourth line time 60d, the voltage on common line 1 returns to a high hold voltage 72, leaving the modulators along common line 1 in their respective addressed states. The voltage on common line 2 is decreased to a low address voltage 78. Because a high segment voltage 62 is applied along segment line 2, the pixel voltage across modulator (2,2) is below the lower end of the negative stability window of the modulator, causing the modulator (2,2) to actuate. Conversely, because a low segment voltage 64 is applied along segment lines 1 and 3, the modulators (2,1) and (2,3) remain in a relaxed position. The voltage on common line 3 increases to a high hold voltage 72, leaving the modulators along common line 3 in a relaxed state.

Finally, during the fifth line time 60e, the voltage on common line 1 remains at high hold voltage 72, and the voltage on common line 2 remains at a low hold voltage 76, leaving the modulators along common lines 1 and 2 in their respective addressed states. The voltage on common line 3 increases to a high address voltage 74 to address the modulators along common line 3. As a low segment voltage 64 is applied on segment lines 2 and 3, the modulators (3,2) and (3,3) actuate, while the high segment voltage 62 applied along segment line 1 causes modulator (3,1) to remain in a relaxed position. Thus, at the end of the fifth line time 60e, the 3×3 pixel array is in the state shown in FIG. 5A, and will remain in that state as long as the hold voltages are applied along the common lines, regardless of variations in the segment voltage which may occur when modulators along other common lines (not shown) are being addressed.

In the timing diagram of FIG. 5B, a given write procedure (i.e., line times 60a-60e) can include the use of either high hold and address voltages, or low hold and address voltages. Once the write procedure has been completed for a given common line (and the common voltage is set to the hold voltage having the same polarity as the actuation voltage), the pixel voltage remains within a given stability window, and does not pass through the relaxation window until a release voltage is applied on that common line. Furthermore, as each modulator is released as part of the write procedure prior to addressing the modulator, the actuation time of a modulator, rather than the release time, may determine the necessary line time. Specifically, in implementations in which the release time of a modulator is greater than the actuation time, the release voltage may be applied for longer than a single line time, as depicted in FIG. 5B. In some other implementations, voltages applied along common lines or segment lines may vary to account for variations in the actuation and release voltages of different modulators, such as modulators of different colors.

Figure 6A:
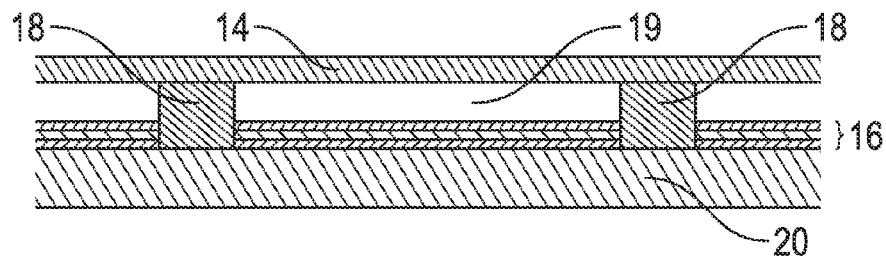
FIG. 6A shows an example of a partial cross-section of the interferometric modulator display of FIG. 1.
Figure 6B:
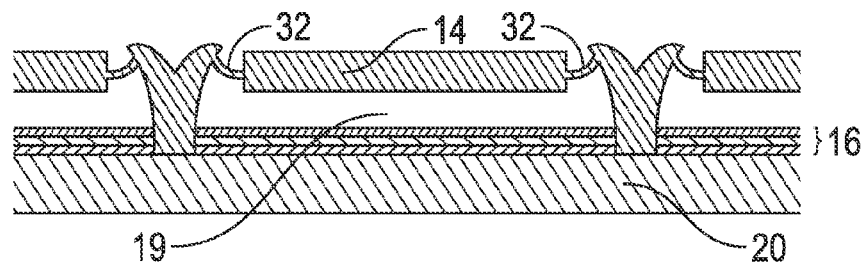
FIGS. 6B-6E show examples of cross-sections of varying implementations of interferometric modulators.
Figure 6C:
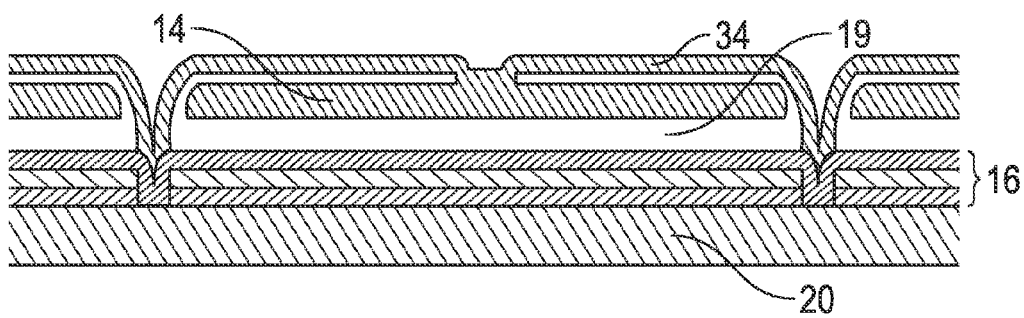

The details of the structure of interferometric modulators that operate in accordance with the principles set forth above may vary widely. For example, FIGS. 6A-6E show examples of cross-sections of varying implementations of interferometric modulators, including the movable reflective layer 14 and its supporting structures. FIG. 6A shows an example of a partial cross-section of the interferometric modulator display of FIG. 1, where a strip of metal material, i.e., the movable reflective layer 14 is deposited on supports 18 extending orthogonally from the substrate 20. In FIG. 6B, the movable reflective layer 14 of each IMOD is generally square or rectangular in shape and attached to supports at or near the corners, on tethers 32. In FIG. 6C, the movable reflective layer 14 is generally square or rectangular in shape and suspended from a deformable layer 34, which may include a flexible metal. The deformable layer 34 can connect, directly or indirectly, to the substrate 20 around the perimeter of the movable reflective layer 14. These connections are herein referred to as support posts. The implementation shown in FIG. 6C has additional benefits deriving from the decoupling of the optical functions of the movable reflective layer 14 from its mechanical functions, which are carried out by the deformable layer 34. This decoupling allows the structural design and materials used for the reflective layer 14 and those used for the deformable layer 34 to be optimized independently of one another.

Figure 6D:
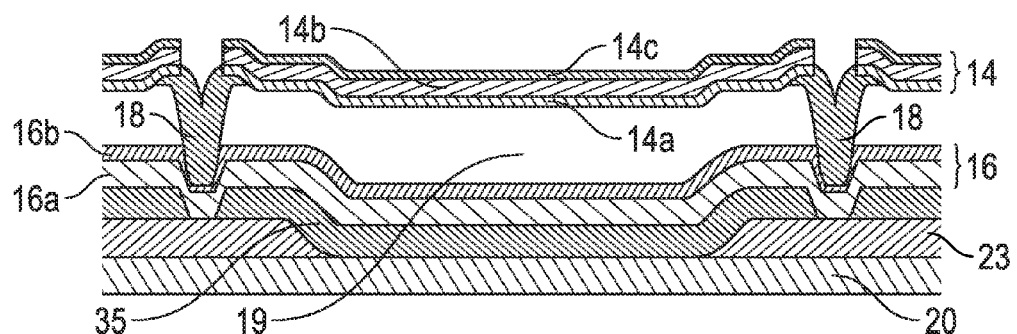

FIG. 6D shows another example of an IMOD, where the movable reflective layer 14 includes a reflective sub-layer 14a. The movable reflective layer 14 rests on a support structure, such as support posts 18. The support posts 18 provide separation of the movable reflective layer 14 from the lower stationary electrode (i.e., part of the optical stack 16 in the illustrated IMOD) so that a gap 19 is formed between the movable reflective layer 14 and the optical stack 16, for example when the movable reflective layer 14 is in a relaxed position. The movable reflective layer 14 also can include a conductive layer 14c, which may be configured to serve as an electrode, and a support layer 14b. In this example, the conductive layer 14c is disposed on one side of the support layer 14b, distal from the substrate 20, and the reflective sub-layer 14a is disposed on the other side of the support layer 14b, proximal to the substrate 20. In some implementations, the reflective sub-layer 14a can be conductive and can be disposed between the support layer 14b and the optical stack 16. The support layer 14b can include one or more layers of a dielectric material, for example, silicon oxynitride (SiON) or silicon dioxide ($SiO_2$). In some implementations, the support layer 14b can be a stack of layers, such as, for example, a $SiO_2$/SiON/$SiO_2$ tri-layer stack. Either or both of the reflective sub-layer 14a and the conductive layer 14c can include, e.g., an aluminum (Al) alloy with about 0.5% copper (Cu), or another reflective metallic material. Employing conductive layers 14a, 14c above and below the dielectric support layer 14b can balance stresses and provide enhanced conduction. In some implementations, the reflective sub-layer 14a and the conductive layer 14c can be formed of different materials for a variety of design purposes, such as achieving specific stress profiles within the movable reflective layer 14.

As illustrated in FIG. 6D, some implementations also can include a black mask structure 23. The black mask structure 23 can be formed in optically inactive regions (e.g., between pixels or under posts 18) to absorb ambient or stray light. The black mask structure 23 also can improve the optical properties of a display device by inhibiting light from being reflected from or transmitted through inactive portions of the display, thereby increasing the contrast ratio. Additionally, the black mask structure 23 can be conductive and be configured to function as an electrical bussing layer. In some implementations, the row electrodes can be connected to the black mask structure 23 to reduce the resistance of the connected row electrode. The black mask structure 23 can be formed using a variety of methods, including deposition and patterning techniques. The black mask structure 23 can include one or more layers. For example, in some implementations, the black mask structure 23 includes a molybdenum-chromium (MoCr) layer that serves as an optical absorber, a layer, and an aluminum alloy that serves as a reflector and a bussing layer, with a thickness in the range of about 30-80 Å, 500-1000 Å, and 500-6000 Å, respectively. The one or more layers can be patterned using a variety of techniques, including photolithography and dry etching, including, for example, carbon tetrafluoride ($CF_4$) and/or oxygen ($O_2$) for the MoCr and $SiO_2$ layers and chlorine ($Cl_2$) and/or boron trichloride ($BCl_3$) for the aluminum alloy layer. In some implementations, the black mask 23 can be an etalon or interferometric stack structure. In such interferometric stack black mask structures 23, the conductive absorbers can be used to transmit or bus signals between lower, stationary electrodes in the optical stack 16 of each row or column. In some implementations, a spacer layer 35 can serve to generally electrically isolate the absorber layer 16a from the conductive layers in the black mask 23.

Figure 6E:
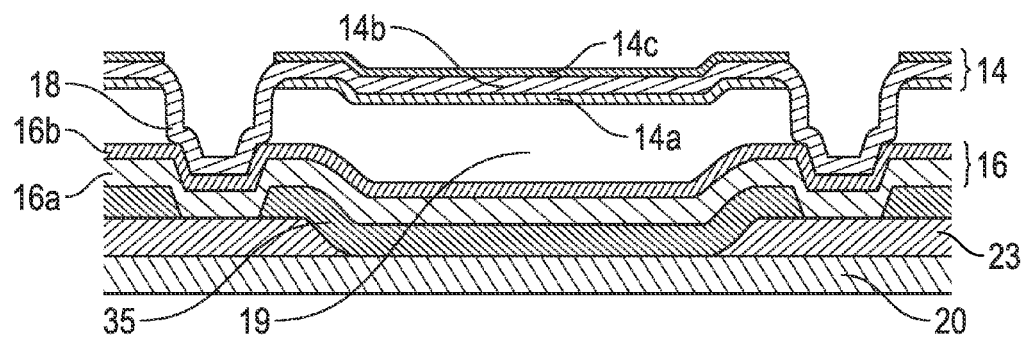

FIG. 6E shows another example of an IMOD, where the movable reflective layer 14 is self supporting. In contrast with FIG. 6D, the implementation of FIG. 6E does not include support posts 18. Instead, the movable reflective layer 14 contacts the underlying optical stack 16 at multiple locations, and the curvature of the movable reflective layer 14 provides sufficient support that the movable reflective layer 14 returns to the unactuated position of FIG. 6E when the voltage across the interferometric modulator is insufficient to cause actuation. The optical stack 16, which may contain a plurality of several different layers, is shown here for clarity including an optical absorber 16a, and a dielectric 16b. In some implementations, the optical absorber 16a may serve both as a fixed electrode and as a partially reflective layer.

In implementations such as those shown in FIGS. 6A-6E, the IMODs function as direct-view devices, in which images are viewed from the front side of the transparent substrate 20, i.e., the side opposite to that upon which the modulator is arranged. In these implementations, the back portions of the device (that is, any portion of the display device behind the movable reflective layer 14, including, for example, the deformable layer 34 illustrated in FIG. 6C) can be configured and operated upon without impacting or negatively affecting the image quality of the display device, because the reflective layer 14 optically shields those portions of the device. For example, in some implementations a bus structure (not illustrated) can be included behind the movable reflective layer 14 which provides the ability to separate the optical properties of the modulator from the electromechanical properties of the modulator, such as voltage addressing and the movements that result from such addressing. Additionally, the implementations of FIGS. 6A-6E can simplify processing, such as, e.g., patterning.

Figure 7:
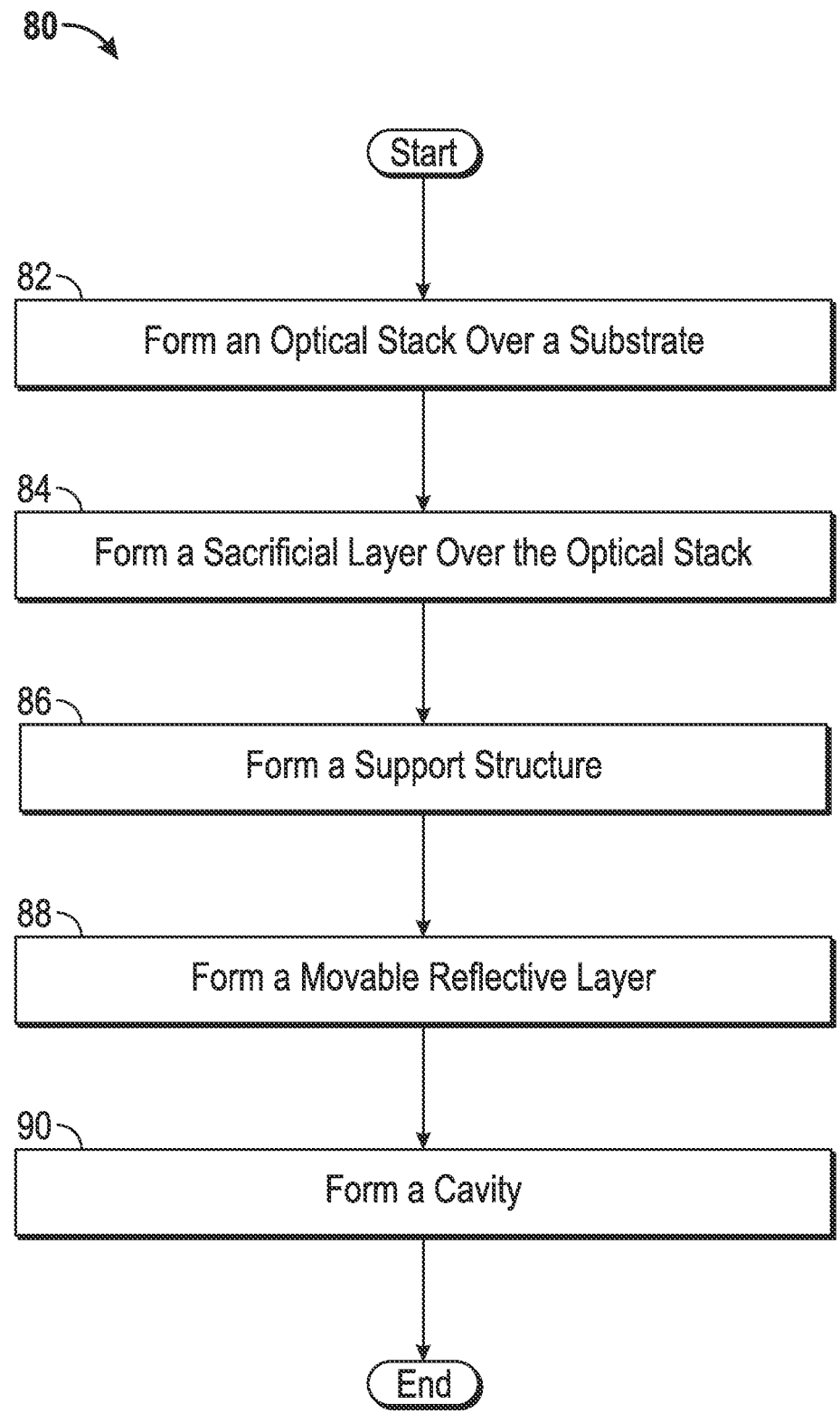
FIG. 7 shows an example of a flow diagram illustrating a manufacturing process for an interferometric modulator.
Figure 8A:
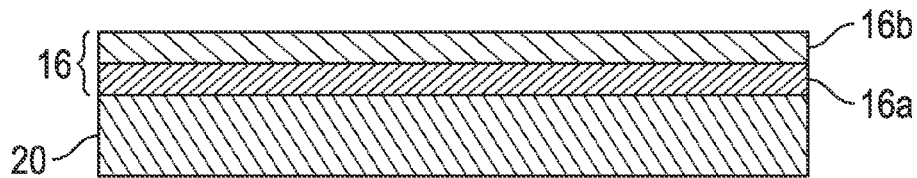
FIGS. 8A-8E show examples of cross-sectional schematic illustrations of various stages in a method of making an interferometric modulator.

FIG. 7 shows an example of a flow diagram illustrating a manufacturing process 80 for an interferometric modulator, and FIGS. 8A-8E show examples of cross-sectional schematic illustrations of corresponding stages of such a manufacturing process 80. In some implementations, the manufacturing process 80 can be implemented to manufacture, e.g., interferometric modulators of the general type illustrated in FIGS. 1 and 6, in addition to other blocks not shown in FIG. 7. With reference to FIGS. 1, 6 and 7, the process 80 begins at block 82 with the formation of the optical stack 16 over the substrate 20. FIG. 8A illustrates such an optical stack 16 formed over the substrate 20. The substrate 20 may be a transparent substrate such as glass or plastic, it may be flexible or relatively stiff and unbending, and may have been subjected to prior preparation processes, e.g., cleaning, to facilitate efficient formation of the optical stack 16. As discussed above, the optical stack 16 can be electrically conductive, partially transparent and partially reflective and may be fabricated, for example, by depositing one or more layers having the desired properties onto the transparent substrate 20. In FIG. 8A, the optical stack 16 includes a multilayer structure having sub-layers 16a and 16b, although more or fewer sub-layers may be included in some other implementations. In some implementations, one of the sub-layers 16a, 16b can be configured with both optically absorptive and conductive properties, such as the combined conductor/absorber sub-layer 16a. Additionally, one or more of the sub-layers 16a, 16b can be patterned into parallel strips, and may form row electrodes in a display device. Such patterning can be performed by a masking and etching process or another suitable process known in the art. In some implementations, one of the sub-layers 16a, 16b can be an insulating or dielectric layer, such as sub-layer 16b that is deposited over one or more metal layers (e.g., one or more reflective and/or conductive layers). In addition, the optical stack 16 can be patterned into individual and parallel strips that form the rows of the display.

Figure 8B:
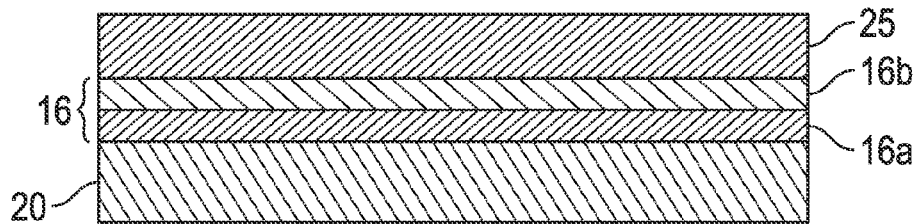

The process 80 continues at block 84 with the formation of a sacrificial layer 25 over the optical stack 16. The sacrificial layer 25 is later removed (e.g., at block 90) to form the cavity 19 and thus the sacrificial layer 25 is not shown in the resulting interferometric modulators 12 illustrated in FIG. 1. FIG. 8B illustrates a partially fabricated device including a sacrificial layer 25 formed over the optical stack 16. The formation of the sacrificial layer 25 over the optical stack 16 may include deposition of a xenon difluoride ($XeF_2$)-etchable material such as molybdenum (Mo) or amorphous silicon (a-Si), in a thickness selected to provide, after subsequent removal, a gap or cavity 19 (see also FIGS. 1 and 8E) having a desired design size. Deposition of the sacrificial material may be carried out using deposition techniques such as physical vapor deposition (PVD, e.g., sputtering), plasma-enhanced chemical vapor deposition (PECVD), thermal chemical vapor deposition (thermal CVD), or spin-coating.

Figure 8C:
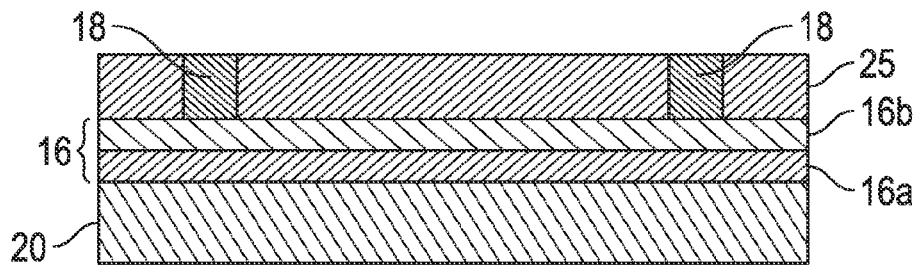

The process 80 continues at block 86 with the formation of a support structure e.g., a post 18 as illustrated in FIGS. 1, 6 and 8C. The formation of the post 18 may include patterning the sacrificial layer 25 to form a support structure aperture, then depositing a material (e.g., a polymer or an inorganic material, e.g., silicon oxide) into the aperture to form the post 18, using a deposition method such as PVD, PECVD, thermal CVD, or spin-coating. In some implementations, the support structure aperture formed in the sacrificial layer can extend through both the sacrificial layer 25 and the optical stack 16 to the underlying substrate 20, so that the lower end of the post 18 contacts the substrate 20 as illustrated in FIG. 6A. Alternatively, as depicted in FIG. 8C, the aperture formed in the sacrificial layer 25 can extend through the sacrificial layer 25, but not through the optical stack 16. For example, FIG. 8E illustrates the lower ends of the support posts 18 in contact with an upper surface of the optical stack 16. The post 18, or other support structures, may be formed by depositing a layer of support structure material over the sacrificial layer 25 and patterning portions of the support structure material located away from apertures in the sacrificial layer 25. The support structures may be located within the apertures, as illustrated in FIG. 8C, but also can, at least partially, extend over a portion of the sacrificial layer 25. As noted above, the patterning of the sacrificial layer 25 and/or the support posts 18 can be performed by a patterning and etching process, but also may be performed by alternative etching methods.

Figure 8D:
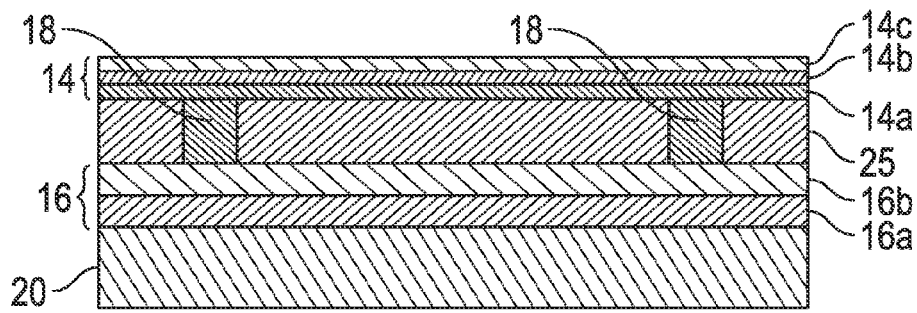
Figure 8E:
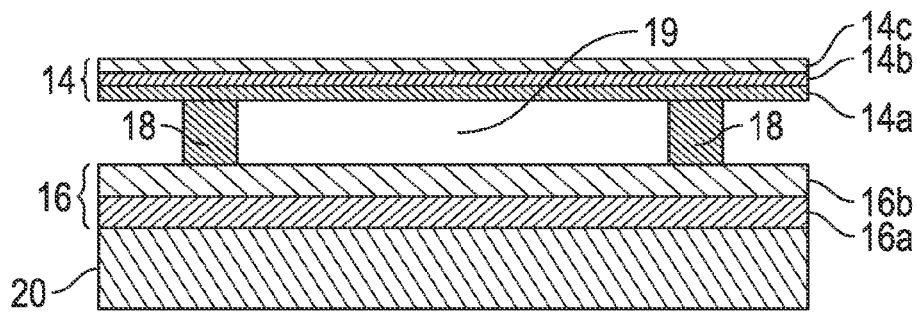

The process 80 continues at block 88 with the formation of a movable reflective layer or membrane such as the movable reflective layer 14 illustrated in FIGS. 1, 6 and 8D. The movable reflective layer 14 may be formed by employing one or more deposition steps, e.g., reflective layer (e.g., aluminum, aluminum alloy) deposition, along with one or more patterning, masking, and/or etching steps. The movable reflective layer 14 can be electrically conductive, and referred to as an electrically conductive layer. In some implementations, the movable reflective layer 14 may include a plurality of sub-layers 14a, 14b, 14c as shown in FIG. 8D. In some implementations, one or more of the sub-layers, such as sub-layers 14a, 14c, may include highly reflective sub-layers selected for their optical properties, and another sub-layer 14b may include a mechanical sub-layer selected for its mechanical properties. Since the sacrificial layer 25 is still present in the partially fabricated interferometric modulator formed at block 88, the movable reflective layer 14 is typically not movable at this stage. A partially fabricated IMOD that contains a sacrificial layer 25 may also be referred to herein as an "unreleased" IMOD. As described above in connection with FIG. 1, the movable reflective layer 14 can be patterned into individual and parallel strips that form the columns of the display.

The process 80 continues at block 90 with the formation of a cavity, e.g., cavity 19 as illustrated in FIGS. 1, 6 and 8E. The cavity 19 may be formed by exposing the sacrificial material 25 (deposited at block 84) to an etchant. For example, an etchable sacrificial material such as Mo or amorphous Si may be removed by dry chemical etching, e.g., by exposing the sacrificial layer 25 to a gaseous or vaporous etchant, such as vapors derived from solid $XeF_2$ for a period of time that is effective to remove the desired amount of material, typically selectively removed relative to the structures surrounding the cavity 19. Other etching methods, e.g. wet etching and/or plasma etching, also may be used. Since the sacrificial layer 25 is removed during block 90, the movable reflective layer 14 is typically movable after this stage. After removal of the sacrificial material 25, the resulting fully or partially fabricated IMOD may be referred to herein as a "released" IMOD.

In certain implementations, electromechanical system (EMS) devices may be incorporated into display devices which include frontlight systems for redirecting light towards a display array, or touchscreens for receiving user input. Certain implementations of frontlight systems and touchscreens include structures which overlie an active area of the display but are masked to reduce the optical effect of these structures on the appearance of the display.

For example, certain implementations of frontlight systems utilize frontlight films which include reflective facets which are configured to redirect light propagating within the frontlight film towards the display array. In display devices which include reflective display elements, such as interferometric modulators, this redirected waveguiding light is incident upon the reflective display elements and then reflected back towards a viewer, through the frontlight film. Thus, such a frontlight film allows an illuminating light source to be positioned at a location offset from the display itself, such as at one of the edges of the frontlight film. Light from the light source can propagate throughout the frontlight film through total internal reflection before it strikes a facet and is redirected out of the frontlight film and towards a display array. Because these reflective facets may in some implementations include a reflective material, a mask may be provided on the side of the reflective material opposite the display array to prevent light from reflecting off of the back side of the reflective material, interfering with the appearance of the display device.

Similarly, a touch screen array may include a plurality of crisscrossing electrodes arranged in a grid pattern to form a capacitive touchscreen array. Certain materials which may be used in these electrodes may be partially or highly reflective. These electrodes may also be provided with a mask on the viewable side of the electrode to prevent undesirable optical effects resulting from the reflection of light off of the electrodes.

Figure 9A:
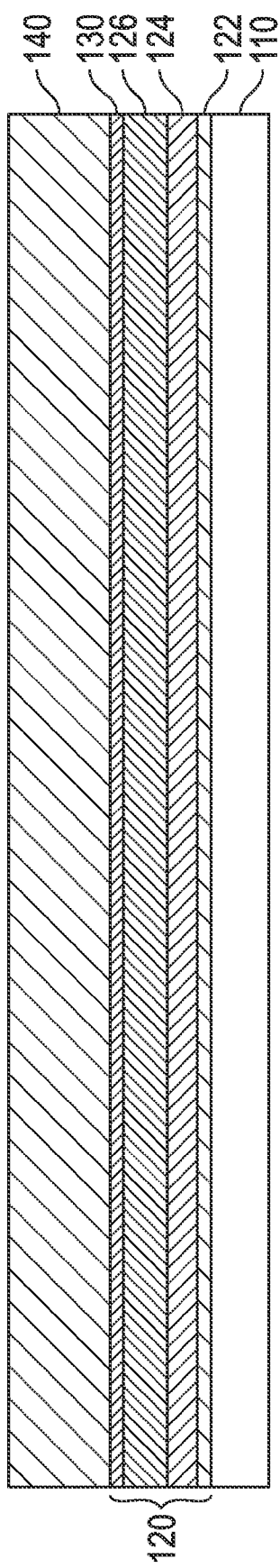

FIGS. 9A-9F show an example of a process for forming masked structures on a substrate. In FIG. 9A, a precursor stack of layers are formed on a substrate 110. The substrate 110 may be formed of any suitable light-transmissive material, although in some implementations, the substrate 110 may be at least somewhat flexible to facilitate its use in a roll-to-toll fabrication process. In an implementation in which the substrate 110 may be adjacent a frontlight film, as discussed in greater detail below, the substrate 110 may be formed from a material which has a low index of refraction relative to the material of the frontlight film. In particular implementations, such a material may have an index of refraction of less than about 1.4, in order to facilitate total internal reflection of light propagating within the adjacent frontlight film.

Still with respect to FIG. 9A, the precursor stack of layers includes one or more layers which will form part of a masking structure, a black mask, or a dark mask, which can shield overlying reflective or opaque materials from view. In the illustrated implementation, these masking layers include an interferometric film stack 120 formed on the substrate 110, including an absorber layer 122, a spacer layer 124, and a reflective layer 126. In some implementations, the absorber layer 122 may include molybdenum (Mo) or a molybdenum-chrome alloy (MoCr). In some implementations, the spacer layer 124 may include a dielectric layer such as silicon oxide ($SiO_2$). In some implementations, the reflective layer 126 may include a layer of aluminum (Al). Although referred to as a reflective layer 126 herein, implementations in which only masked wiring is formed on the substrate 110 may include a conductive layer which is not necessarily reflective.

In the illustrated implementation, the reflective layer 126 will also serve as the conductor in the masked wiring to be formed on substrate 110, and as the primary reflective component of the masked reflective facets to be formed on substrate 110. The spacer layer 124 and absorber layer 122 can, in conjunction with reflective layer 126, form a dark etalon or interferometric black mask to inhibit reflection of light from the side of these structures adjacent the substrate 110 so as to mask these structures from a viewer located on the opposite side of substrate 110 from these structures. In other implementations, an opaque layer may be used in place of the spacer layer 124 and absorber layer 122 to form a dark mask.

As can also be seen in FIG. 9A, an etch leading layer 130 has been formed above the interferometric film stack 120. In some implementations, the etch leading layer 130 may include an aluminum-neodymium alloy (AlNd). In other implementations, any suitable material may be used for etch leading layer 130, so long as the etch leading layer 130 is etchable at a greater rate than the reflective layer 126 by an etch used later in the fabrication process. A masking layer 140 has also been formed over the etch leading layer 130. In some implementations, the masking layer 140 may include a layer of photoresist, although other suitable materials may also be used.

Figure 9B:
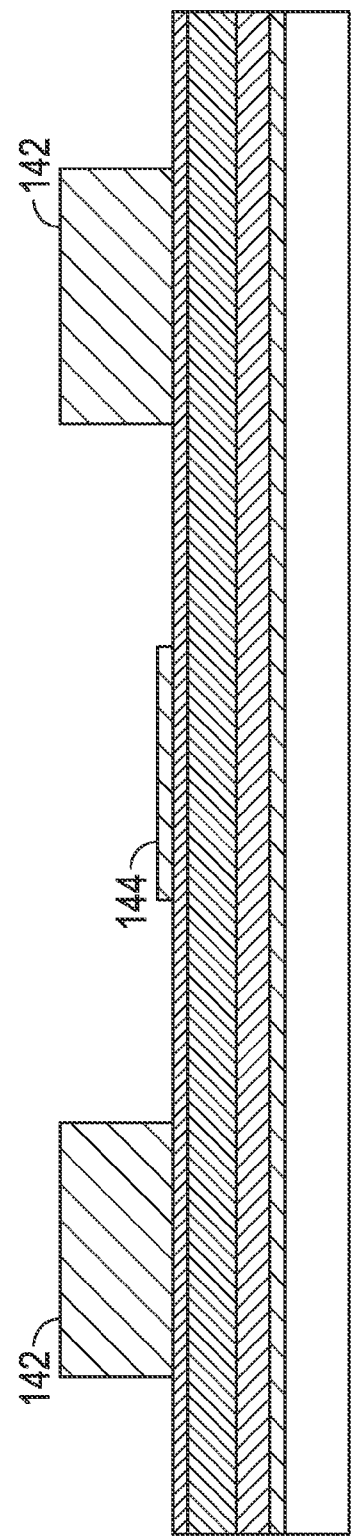

In FIG. 9B, the masking layer 140 (see FIG. 9A) has been patterned to form masking structures having two different thicknesses. Thick masking structures 142 will be used to define reflective facets, and thin masking structures 144 will be used to define wiring. In implementations in which the masking layer 140 includes photoresist, these masking structures 142 and 144 may be formed through partial exposure of the photoresist, where the amount of exposure in the regions which will form thick masking structures 142 is different from the amount of exposure in the regions which will form thin masking structures 144. For example, gray-scale lithography may be used to control the amount of light to which the masking layer 140 is exposed, controlling the rate at which different portion of a photoresist masking layer 140 is developed. In other implementations, imprinting or embossing may be used to form the desired structures, and in such implementations, the masking layer 140 may be a material other than a photoresist. By using an imprinting or embossing mask having features having desired height or depths, a masking layer 140 may be pattered into sections having two or more thicknesses.

In FIG. 9C, the layers 120-130 underlying the masking structures 142 and 144 are etched using a stack etch which etches each of these layers relative to the material of the masking layer 140. In the illustrated implementation, this stack etch forms generally tapered structures 127 underlying each of the masking structures 142 or 144. The shape of these tapered structures 127 at this stage, as well as the amount of taper of each individual layer within tapered structures 127, is at least partially dependent on the relative thicknesses of the layers and the relative selectivity of the stack etch with respect to each of these layers 120-130.

In FIG. 9D, the masking structures are etched using a directional etch which removes the thin masking structures 144, and reduces the thickness of the thick masking structures 144, forming residual masking structures 146. As can be seen in FIG. 9D, the tapered structures 127 in the locations where the wiring will be formed are now unmasked, and the tapered structures 127 in the locations where the reflective facets will be formed are still masked.

In FIG. 9E, a shaping etch has been performed using an etch which, as discussed above, etches the etch leading layer 130 faster than the reflective layer 126. This etch forms masked wiring structures 150 from the tapered structures 128 which do not include an overlying residual masking structure 146. The exposed etch leading layer 130 of these tapered structures 128 is etched both from above and from the side, and is quickly removed, such that the height of the reflective layer 126 within the masked wiring structures 150 may be reduced by this etch in a generally even fashion across the width of the reflective layer 126.

The same etch also forms masked reflective facets 160 from the tapered structures 128 underlying the residual masking portions 146. The etch leading layer 130 overlying the exposed structures which will form the masked wiring 150 is quickly removed, and the thickness of the reflective layer 130 is reduced generally evenly across the width of the masked wiring 150. The etch leading layer 130 underlying the residual masking portions 146 is etched at a greater rate than the underlying reflective layer 126, exposing the reflective layer 126 to the etch from both above and from the side.

The amount of time required to achieve a desired etch will vary depending on various factors, such as, for example, the chemistry and concentration of the etch, the temperature at which the etch is performed, and the thickness of the material. In some implementations, such an etch may take between about one minute and about 40 minutes, although etch times outside of that range may also be used.

In some implementations, the reflective facets may be greater than about 0.5 μm in height, and in particular implementations, may be between about 1 and about 2 μm in height. For reflective facets 160 having a height between about 1 and about 2 μm in height, the etch may reduce the height of the reflective layer 126 within the masked wiring structures to between about 500 Å and about 1000 Å, although other thicknesses may be possible. In such implementations, the etch time may be roughly about 20-30 minutes, although this etch time can be altered by controlling the other variables discussed above.

The relative thicknesses of the etch leading layer 130 and the reflective layer 126, along with their relative etch rates when exposed to the shaping etch, will determine the angle of the taper of the reflective layer 126 in the masked reflective facet 160. In some implementations, the thickness of the reflective layer 126 is roughly one order of magnitude greater than the thickness of the etch leading layer 130, so that the reflective layer 126 serves as the primary reflective surface in the masked reflective facet 160. The residual portion of the etch leading layer 130 will have a slightly different taper, but will have a much smaller reflective side surface.

In the illustrated implementation, the taper of the reflective layer 126 may form an angle of roughly 40-50 degrees to the underlying surface of the substrate 110. In other implementations, the taper angle of the reflective layer 126 may be determined based in part on a variety of factors, such as the refractive index and other properties of other layers/structures (not shown in FIG. 9E) which will form a part of a finished optical structure. For example, because light reflected downward by the tapered sidewall of the reflective layer 126 may pass through underlying layers in a finished device, the relative indices of refraction of these layers will affect the overall path of the reflected light due to refraction at the boundaries between those layers. In an implementation in which the masked reflective facet 160 forms part of a frontlight system overlying a reflective display, the taper angle of the reflective layer 126, the primary reflective surface, generally determines the angular direction along which down-reflected light proceeds towards the underlying reflective display, as well as the resulting angular direction along which output light passes through the included optical layers of the complete display device and outwards towards a viewer on the opposite side of substrate 110 from the masked reflective facets 160 and masked wiring 150. This resulting angular output direction depends not only on the taper angle of the reflective layer 126, but also on all the refractive indices and corresponding physical thickness of each included material layer within the display as a consequence of the refraction that occurs at the boundaries between those layers.

Finally, in FIG. 9F, the residual masking portions 146 (see FIG. 9E) overlying the masked reflective facets 160 is removed to form a finished component 100 including both masked wiring 150 and masked reflective facets 160 on a substrate 110. Both of the masked wiring 150 and masked reflective facets 160 include a masking structure 128 disposed between the substrate 110 and a functional component, such as a tapered reflective structure 162 or wiring 152. In the illustrated implementation, both tapered reflective structure 162 and wiring 152 include the material of reflective layer 126, although at least the tapered reflective structure 162 may also include a portion of the etch leading layer 130 as well.

In the illustrated implementation, the masking structure 128 includes layers which cooperate with the overlying reflective layer to form a dark etalon or interferometric black mask. Thus, the inclusion of an overlying reflective layer 126 increases the degree of masking provided by the masking structure 128 as compared to an implementation in which an intervening overlying layer is, for example, opaque but not reflective. In other implementations, as will be discussed in greater detail below, a masking structure may provide a degree of masking independent of the optical properties of an overlying layer.

Figure 10:
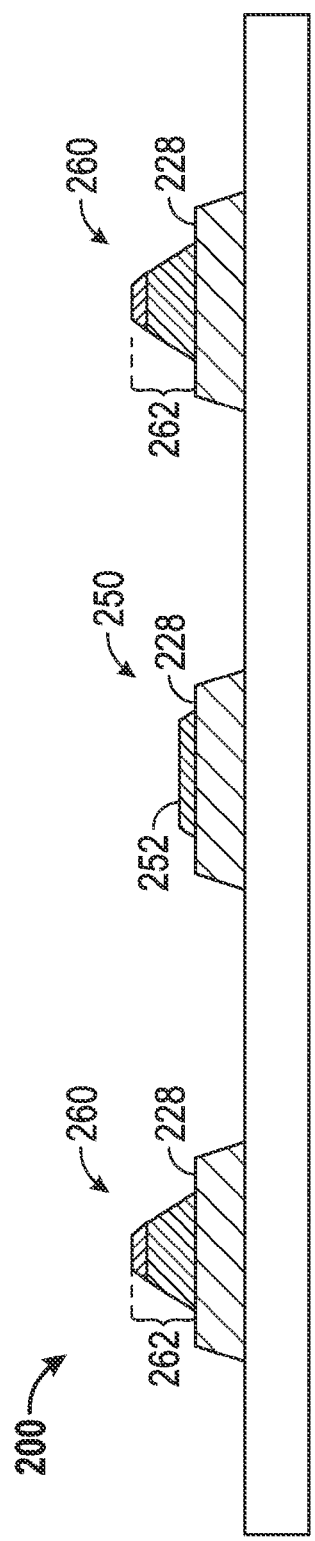
FIG. 10 shows an example of another implementation of a substrate having masked structures formed thereon.

FIG. 10 shows an example of another implementation of a substrate having masked structures formed thereon. In particular, the component 200 includes masked wiring 250 and masked reflective facets 260 on a substrate 210. The masked wiring 250 includes wiring 252 and a masking structure 228 disposed between the wiring 252 and the substrate 210. The masked reflective facets 260 similarly include a tapered reflective structure 262 and a masking structure 228 disposed between the tapered reflective structure 262 and the substrate 210. In contrast to the component 100 of FIG. 9F, the component 200 of FIG. 10 includes masking structures 228 which may be formed from a single layer, such as a single layer of opaque material. Thus, in some implementations, a masking structure 228 may provide a dark mask or black mask without necessarily being formed from an interferometric black mask. Such a dark mask or black mask may in particular implementations provide a degree of masking which is substantially independent of the optical properties of an overlying layer or structure.

Figure 11:
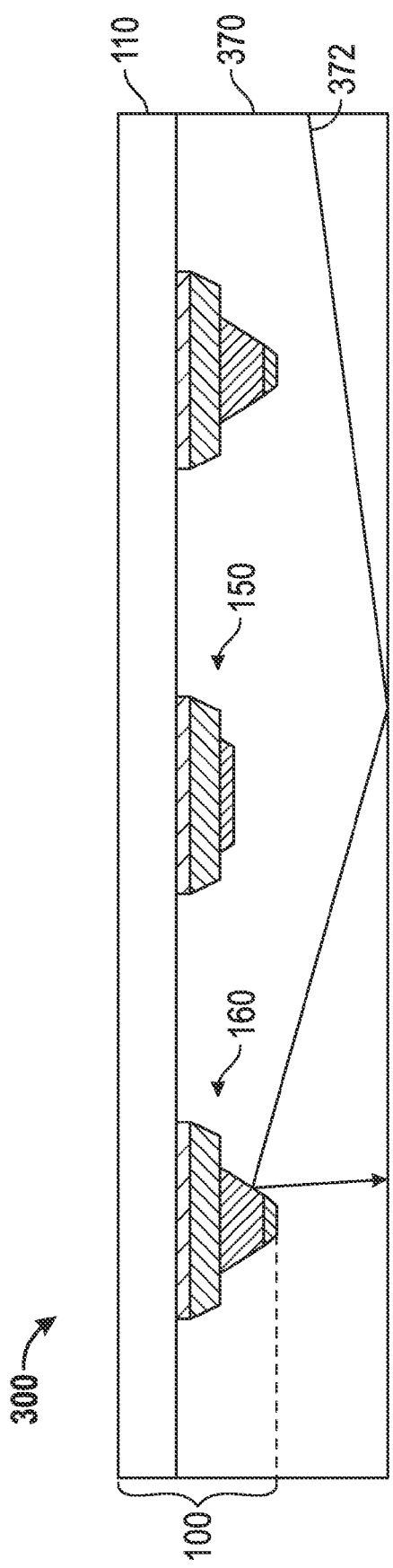
FIG. 11 shows an example of a light-guiding system formed using a component such as the substrate with masked structures formed thereon of FIG. 9F.

FIG. 11 shows an example of a light-guiding system formed using a component such as the substrate with masked structures formed thereon of FIG. 9F. The light-guiding system 300 may be formed by coupling the component 100 of FIG. 9F to a frontlight film 370 or other light-guiding layer. In one implementation, the substrate 110 of the component 100 will form the boundary of a structure within which light 372 injected from a side of the structure may propagate. This light-propagation structure may in some implementations include additional layers adjacent the frontlight film 370. The index of refraction of the substrate 110 material may be selected such that it is less than that of the frontlight film 370, allowing light 372 to propagate within the frontlight film 370 via total internal reflection. When the lower surface of the frontlight film 370 will be similarly bounded by a lower-index material (not shown), the light 372 will continue to propagate within the frontlight film 370 until it strikes a feature such as tapered reflective structure 162 and is reflected downward and out of the frontlight film 370.

The coupling of the component 100 to the frontlight film 370 may be done in a variety of ways. In one implementation, the two may be adhered to one another using a roll-to-roll process. In some implementations, an adhesive can be used to adhere the component 100 to the frontlight film 370. In some implementations, the frontlight film 370 may be deposited on the finished component 100. The frontlight film 370 may include a material which is (at least at the time of the coupling) sufficiently deformable that the masked reflective facets 160 can be pressed into the frontlight film 370 in order to extend into the frontlight film 370. Suitable materials include, but are not limited to, clear and/or light-transmissive plastics such as polymethyl methacrylate (PMMA).

Although the masked wiring 150 is also located within the frontlight film 370, it may have little effect on the operation of the light-guiding system 300, because the majority of the reflective surface of the masked wiring 150 is located substantially parallel to a side of the frontlight film 370, and reflection off of the parallel surface will allow light to continue propagating within the frontlight film 370.

While in the illustrated implementation the frontlight film 370 is a single layer, the frontlight film 370 may in other implementations be a multilayer structure. For example, the component 100 may in some implementations be coupled to a film or sublayer which is less than the overall thickness of the frontlight film 370, and then subsequently coupled with an additional index-matched film or sublayer which together with the previous film or sublayer form the frontlight film 370.

Figure 12:
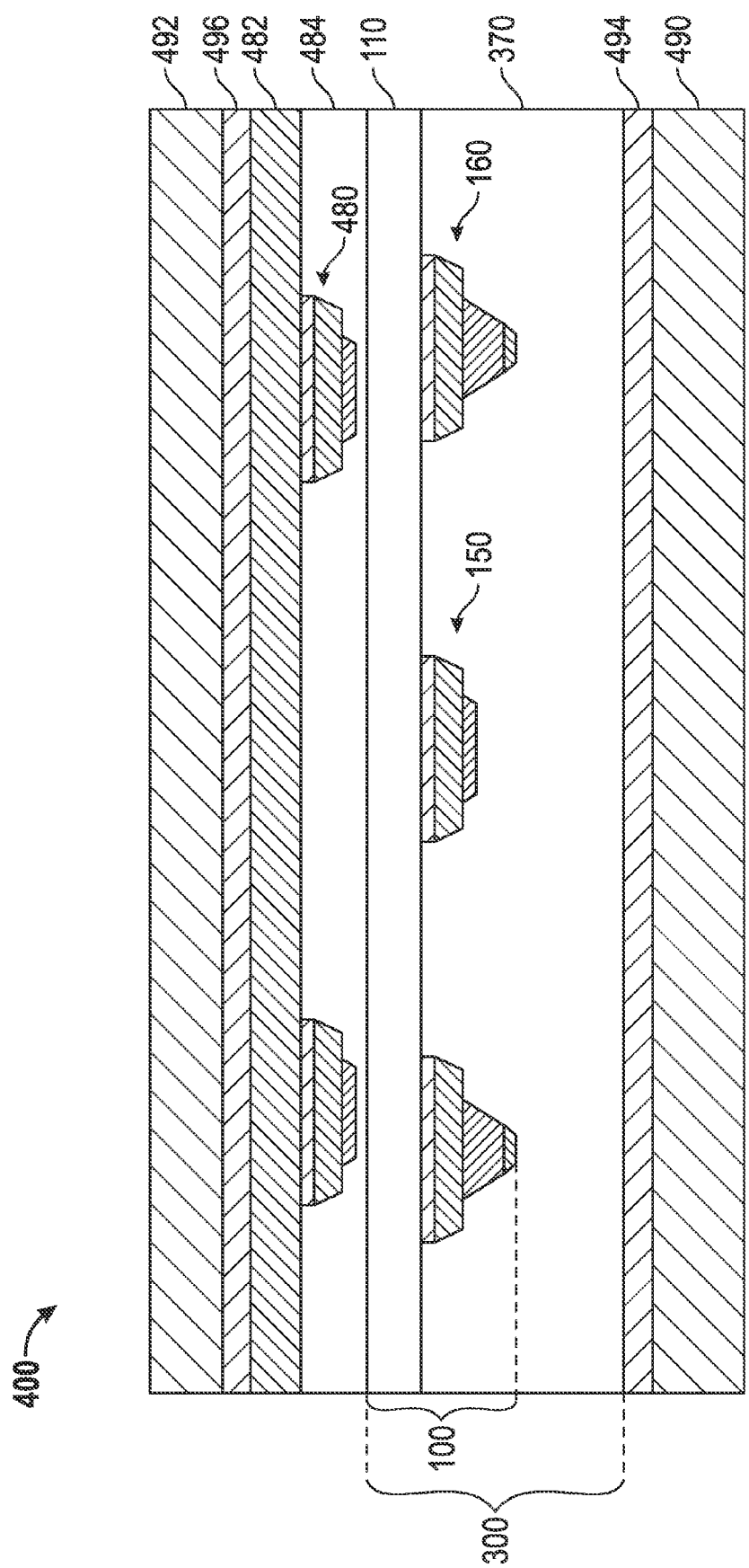
FIG. 12 shows an example of cross-section of a portion of a display device including a light-guiding system such as the light-guiding system of FIG. 11.

FIG. 12 shows an example of cross-section of a portion of a display device including a light-guiding system such as the light-guiding system of FIG. 11. The display device 400 includes the light-guiding system 300, disposed over a reflective display 490 such as an interferometric modulator-based display. Overlying the light-guiding system 300 is additional masked wiring 480 supported by a substrate 482 which may be similar in structure to the masked wiring 150 of light-guiding system 300. In contrast to the substrate 110 of the light-guiding system 300, however, substrate 482 in the illustrated implementation supports only masked wiring 480, and not masked reflective facets in addition to the masked wiring 480. The masked wiring 480 may in the illustrated implementation form a capacitive touch-sensing grid with the masked wiring 150 on substrate 110. In particular, the masked wiring 480 may include electrodes which extend generally perpendicular to electrodes formed by masked wiring 150, such that the plane of FIG. 12 makes a first angle with the electrodes of masked wiring 480 and a second angle, roughly complimentary to the first angle, with the electrodes of masked wiring 150.

The display device 400 may include additional layers disposed throughout the device, including but not limited to a cover lens 492, a diffuser 494, adhesive layers such as the adhesive layer 496, and an intermediate layer 484 which will facilitate the disposition of the substrate 482 and the masked wiring 480 thereon relative to the substrate 110 and the masked wiring 150. The illustrated layers and positioning thereof are merely one implementation, and a wide variety of other additional layers in a variety of different configurations may also be suitable.

Figure 16B:
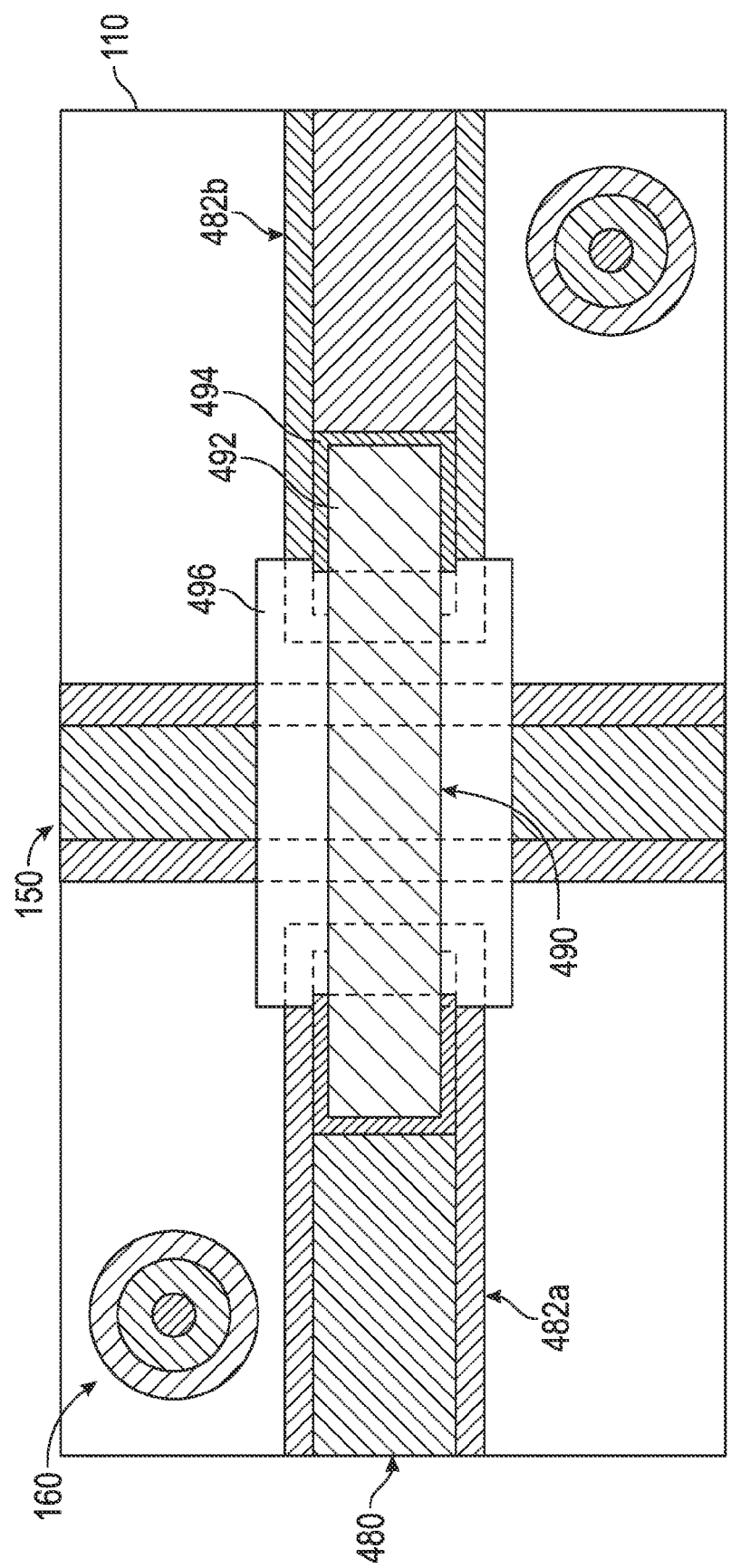
FIG. 16B is a top plan view of the substrate of FIG. 16A.

For example, in other implementations, both masked wiring 150 and generally perpendicular masked wiring 480 may be formed on the substrate 110, along with the masked reflected facets 160. FIG. 16A shows an example of another implementation of a substrate having two sets of masked wiring formed thereon. FIG. 16B is a top plan view of the substrate of FIG. 16A. In such an implementation, the masked wiring 150 may form contiguous electrodes extending across a portion of the substrate. However, to ensure electrical isolation between the masked wiring 150 and masked wiring 480, each of the electrodes of masked wiring 480 may include a series of electrode segments such as the two illustrated electrode segments 482a and 482b extending generally perpendicular to the electrodes of masked wiring 150 but not in contact with the masked wiring 150.

In order to connect the electrode segments of masked wiring 480, including electrode segments 482a and 482b, jumper portions 490 extending between the electrode segments may be formed. These jumper portions 490 may include a conductive section 492 extending over the masked wiring 150, with a buffer layer 496 disposed between the conductive section 492 and the masked wiring 150 to ensure electrical isolation. Because at least a portion of the conductive section 492 extending over the gaps between the electrode segments 482a and 482b may be unmasked when viewed from the opposite side of the substrate 110, the conductive section 492 may in some implementations be formed from a conductive material which is at least partially transparent. For example, the conductive portion 492 may include indium tin oxide (ITO), although other materials may also be suitable.

Depending on the materials used for the conductive section 492 and the electrode segments 482a and 482b, an intervening conductive layer 494 may be disposed between the conductive section 492 and the electrode segments 482a and 482b. In one implementation, the conductive section 492 may be formed from a 500 Angstrom thickness of ITO, and the electrode segments 482a and 482b may include aluminum. To prevent potentially undesirable effects from a direct interface between the aluminum and ITO layers, an intervening conductive layer 494 formed from a 200 Angstrom thickness of molybdenum (Mo) may be formed between the conductive section 592 and the electrode segments 482a and 482b. Thicknesses larger or smaller than those discussed above may also be used, and alternative materials may be used. In some implementations, the intervening conductive layer 494 may not be included.

When a transparent conductive material is used to form conductive portion 492, alignment between the conductive portion 492 and the electrode segments 482a and 482b may not be as precise as if an opaque and/or reflective material were used, as unmasked portions of the transparent conductive material do not likely significantly affect the appearance of the overall structure. While in the illustrated implementation the conductive portion 492 is shown as being narrower than the electrode segments 482a and 482b, in other implementations the conductive portion 492 may be wider than the electrode segments 482a and 482b, to ensure a sufficiently large contact area between the two even if the alignment is not precise.

Figure 13:
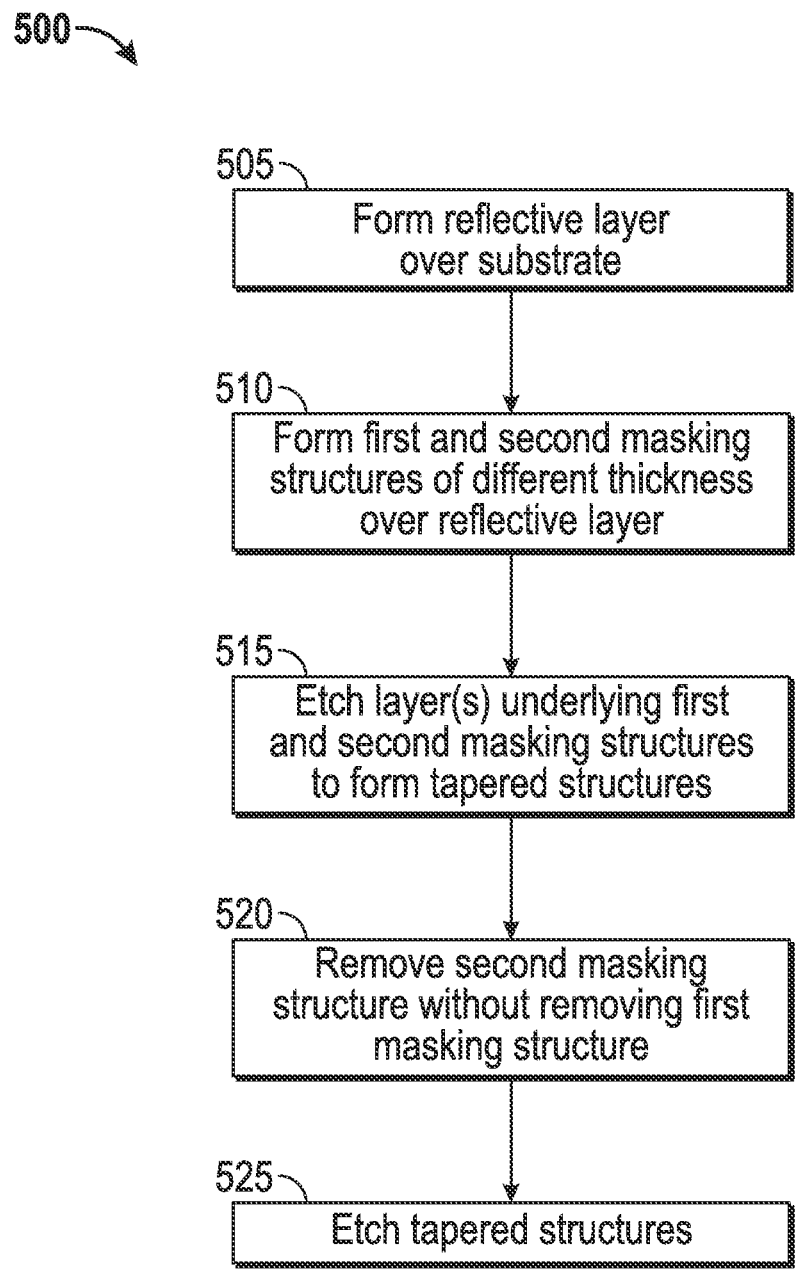
FIG. 13 shows an example of a block diagram illustrating a method of fabricating masked structures on a substrate

FIG. 13 shows an example of a block diagram illustrating a method of fabricating masked structures on a substrate. The method 500 begins at a block 505 where a reflective layer is formed over a substrate. As discussed above, one or more layers which may form part of a masking structure may be formed over the substrate prior to forming the reflective layer. An etch leading layer may be formed after the reflective layer is formed.

The method 500 moves to a block 510, where at least first and second masking structures are formed over the reflective layer, the first and second masking structures having different thicknesses. The first and second masking structures may be formed, for example, by forming an overlying masking layer and exposing the portions of the overlying masking layer which will form the first and second masking structure to differing degrees. The first masking structure may have a thickness greater than a thickness of the second masking structure to enable the second masking structure to be selectively removed in a later step.

The method 500 moves to a block 515 where the reflective layer and any other layers underlying the first and second masking structures are etched. Because of the protection provided by the overlying first and second masking structures, the reflective layer and any other layers underlying these masking structures will be etched to form separate tapered structures. As discussed herein, the size and shape of the tapers will be dependent on the etching rates of the various layers and the thicknesses of the layers.

The method 500 moves to a block 520 where the second masking structure is removed without removing the first masking structure. In one implementation, the second masking structure may be thinner than the first masking structure, so that an etch such as a directional etch can remove the entire second masking structure without removing all of the first masking structure.

The method 500 finally moves to a block 525 where the tapered structures are etched. This etch will etch the tapered structure underlying the first masking structure as well as the tapered structure exposed by removal of the second masking structure. Because the first masking structure protects the upper surface of an underlying tapered structure to be etched, the overall height of the tapered structure may remain substantially constant. In contrast, the tapered structure which underlied the second masking structure before its removal has an unprotected upper surface, and the overall height will be reduced by the etch of block 525.

While the block 525 is illustrated as the final block in the method 500, other implementations of methods of fabrication may include additional operations performed before or after block 525. For example, the first masking structure may be removed after the etch of block 525 are formed, as discussed above. Similarly, structure may be brought into contact with a frontlight film to form a part of a light-guiding structure, as discussed above, and the light-guiding structure formed thereby may be incorporated into a device such as a display device. Additional operations discussed elsewhere in the specification and not specifically discussed with respect to method 500 may also be incorporated into other implementations, along with at least some of the operations of method 500.

FIG. 14 shows an example of a structure formed by the process of FIG. 13. The structure 600 includes tapered reflective structures 662 and tapered wiring 652 formed on a substrate 610. As discussed above, other implementations may include additional layers not depicted in FIG. 14, such as etch leading layers at the top of tapered reflective structures 662 and masking layers underlying the tapered reflective structures 662 and tapered wiring 652.

In some of the implementations discussed above, the etch leading layer operates by being etched at a greater rate than an underlying layer, such that the upper surface of an underlying layer is exposed to an etchant before the lower surface is exposed, creating a desired tapered profile of the underlying layer. In some implementations, this may be accomplished by selection of layer materials and an etchant which provide desired differential etch rates. In further implementations, the structure of the etch leading layer may be controlled, in order to provide an etch leading layer with varying properties over the thickness of the device. For example, the etch leading layer may be a multilayer structure formed by depositing a series of sublayers with increasing etch rates when exposed to the etchant which will be used in the etch process. In other implementations, the composition of the etch leading layer or the deposition conditions may be altered during a deposition process to form an etch leading layer with a property that varies over the thickness of the etch leading layer. The varying properties of the etch leading layer may provide further control over the taper angle of the underlying reflective layer.

In other implementations, a desired tapered shape may be formed through the use of properties other than differential etch rates to create a desired profile. For example, a masking structure may be designed to have poor adhesion with an underlying layer, such that the masking structure may peel back during an etch process to expose the upper surface of an underlying layer. This poor adhesion can be achieved through material selection, such as by depositing an aluminum-neodymium (AlNd) alloy or molybdenum (Mo) over an aluminum layer, or though the use of a particular deposition technique, such a sputter deposition.

Figure 15A:
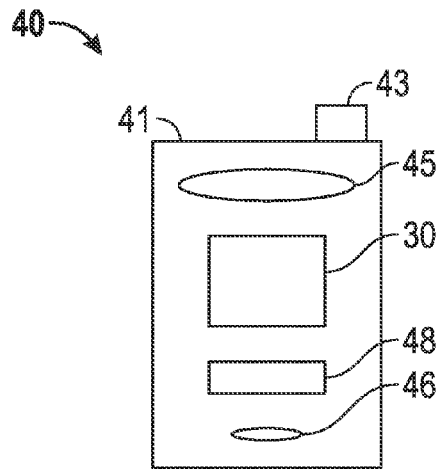
FIGS. 15A and 15B show examples of system block diagrams illustrating a display device that includes a plurality of interferometric modulators.
Figure 15B:
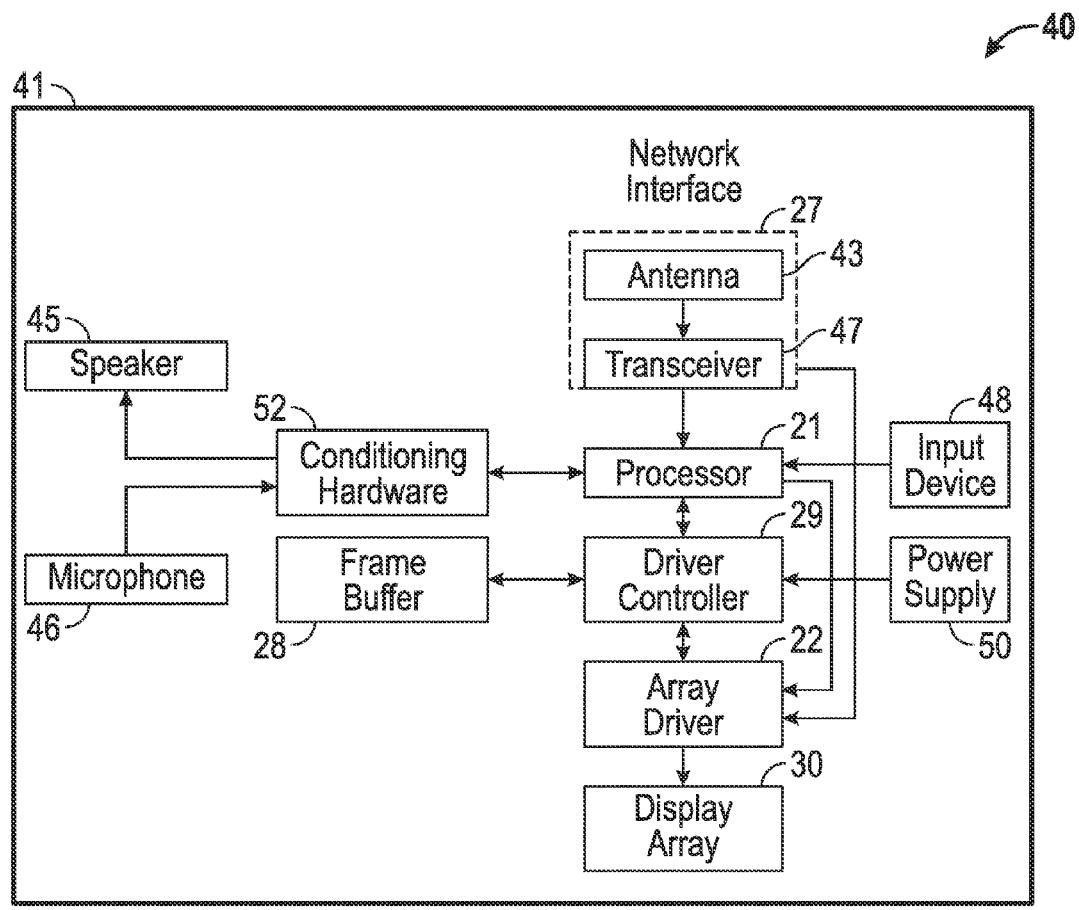

FIGS. 15A and 15B show examples of system block diagrams illustrating a display device 40 that includes a plurality of interferometric modulators. The display device 40 can be, for example, a cellular or mobile telephone. However, the same components of the display device 40 or slight variations thereof are also illustrative of various types of display devices such as televisions, e-readers and portable media players.

The display device 40 includes a housing 41, a display 30, an antenna 43, a speaker 45, an input device 48, and a microphone 46. The housing 41 can be formed from any of a variety of manufacturing processes, including injection molding, and vacuum forming. In addition, the housing 41 may be made from any of a variety of materials, including, but not limited to: plastic, metal, glass, rubber, and ceramic, or a combination thereof. The housing 41 can include removable portions (not shown) that may be interchanged with other removable portions of different color, or containing different logos, pictures, or symbols.

The display 30 may be any of a variety of displays, including a bi-stable or analog display, as described herein. The display 30 also can be configured to include a flat-panel display, such as plasma, EL, OLED, STN LCD, or TFT LCD, or a non-flat-panel display, such as a CRT or other tube device. In addition, the display 30 can include an interferometric modulator display, as described herein.

The components of the display device 40 are schematically illustrated in FIG. 15B. The display device 40 includes a housing 41 and can include additional components at least partially enclosed therein. For example, the display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g., filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. A power supply 50 can provide power to all components as required by the particular display device 40 design.

The network interface 27 includes the antenna 43 and the transceiver 47 so that the display device 40 can communicate with one or more devices over a network. The network interface 27 also may have some processing capabilities to relieve, e.g., data processing requirements of the processor 21. The antenna 43 can transmit and receive signals. In some implementations, the antenna 43 transmits and receives RF signals according to the IEEE 16.11 standard, including IEEE 16.11 (a), (b), or (g), or the IEEE 802.11 standard, including IEEE 802.11a, b, g or n. In some other implementations, the antenna 43 transmits and receives RF signals according to the BLUETOOTH standard. In the case of a cellular telephone, the antenna 43 is designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless network, such as a system utilizing 3G or 4G technology. The transceiver 47 can pre-process the signals received from the antenna 43 so that they may be received by and further manipulated by the processor 21. The transceiver 47 also can process signals received from the processor 21 so that they may be transmitted from the display device 40 via the antenna 43.

In some implementations, the transceiver 47 can be replaced by a receiver. In addition, the network interface 27 can be replaced by an image source, which can store or generate image data to be sent to the processor 21. The processor 21 can control the overall operation of the display device 40. The processor 21 receives data, such as compressed image data from the network interface 27 or an image source, and processes the data into raw image data or into a format that is readily processed into raw image data. The processor 21 can send the processed data to the driver controller 29 or to the frame buffer 28 for storage. Raw data typically refers to the information that identifies the image characteristics at each location within an image. For example, such image characteristics can include color, saturation, and gray-scale level.

The processor 21 can include a microcontroller, CPU, or logic unit to control operation of the display device 40. The conditioning hardware 52 may include amplifiers and filters for transmitting signals to the speaker 45, and for receiving signals from the microphone 46. The conditioning hardware 52 may be discrete components within the display device 40, or may be incorporated within the processor 21 or other components.

The driver controller 29 can take the raw image data generated by the processor 21 either directly from the processor 21 or from the frame buffer 28 and can re-format the raw image data appropriately for high speed transmission to the array driver 22. In some implementations, the driver controller 29 can re-format the raw image data into a data flow having a raster-like format, such that it has a time order suitable for scanning across the display array 30. Then the driver controller 29 sends the formatted information to the array driver 22. Although a driver controller 29, such as an LCD controller, is often associated with the system processor 21 as a stand-alone Integrated Circuit (IC), such controllers may be implemented in many ways. For example, controllers may be embedded in the processor 21 as hardware, embedded in the processor 21 as software, or fully integrated in hardware with the array driver 22.

The array driver 22 can receive the formatted information from the driver controller 29 and can re-format the video data into a parallel set of waveforms that are applied many times per second to the hundreds, and sometimes thousands (or more), of leads coming from the display's x-y matrix of pixels.

In some implementations, the driver controller 29, the array driver 22, and the display array 30 are appropriate for any of the types of displays described herein. For example, the driver controller 29 can be a conventional display controller or a bi-stable display controller (e.g., an IMOD controller). Additionally, the array driver 22 can be a conventional driver or a bi-stable display driver (e.g., an IMOD display driver). Moreover, the display array 30 can be a conventional display array or a bi-stable display array (e.g., a display including an array of IMODs). In some implementations, the driver controller 29 can be integrated with the array driver 22. Such an implementation is common in highly integrated systems such as cellular phones, watches and other small-area displays.

In some implementations, the input device 48 can be configured to allow, e.g., a user to control the operation of the display device 40. The input device 48 can include a keypad, such as a QWERTY keyboard or a telephone keypad, a button, a switch, a rocker, a touch-sensitive screen, or a pressure- or heat-sensitive membrane. The microphone 46 can be configured as an input device for the display device 40. In some implementations, voice commands through the microphone 46 can be used for controlling operations of the display device 40.

The power supply 50 can include a variety of energy storage devices as are well known in the art. For example, the power supply 50 can be a rechargeable battery, such as a nickel-cadmium battery or a lithium-ion battery. The power supply 50 also can be a renewable energy source, a capacitor, or a solar cell, including a plastic solar cell or solar-cell paint. The power supply 50 also can be configured to receive power from a wall outlet.

In some implementations, control programmability resides in the driver controller 29 which can be located in several places in the electronic display system. In some other implementations, control programmability resides in the array driver 22. The above-described optimization may be implemented in any number of hardware and/or software components and in various configurations.

The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. The word "exemplary" is used exclusively herein to mean "serving as an example, instance, or illustration." Any implementation described herein as "exemplary" is not necessarily to be construed as preferred or advantageous over other implementations. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of the IMOD as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An apparatus, comprising:
   a substrate having a first surface;
   at least one reflective facet formed over the first surface of the substrate, the reflective facet including a reflective layer having a side tapered at an angle to the first surface of the substrate and a first masking structure, the reflective layer disposed between the first masking structure and the first surface of the substracte; and
   at least one electrode formed over the first surface of the substrate, wherein the electrode includes a conductive layer and a second masking structure, the conductive layer disposed between the second masking structure and the first surface of the substrate, the reflective layer of the reflective facet and the conductive layer including at least one common material, wherein a thickness of the conductive layer of the electrode is less than a thickness of the reflective layer of the electrode.

2. The apparatus of claim 1, wherein the masking structures of the reflective facet and the electrode each include:
   an absorber layer; and
   a spacer layer, wherein the absorber layers and the spacer layers form interferometric black masks in conjunction with the reflective layer and the conductive layer, respectively.

3. The apparatus of claim 1, wherein the reflective facet includes an etch leading layer disposed on the side of the reflective layer opposite the first surface of the substrate, wherein the etch leading layer is selectively etchable with respect to the reflective layer at a greater rate than the reflective layer.

4. The apparatus of claim 1, wherein the substrate includes glass.

5. The apparatus of claim 1, wherein the substrate includes a flexible material.

6. The apparatus of claim 1, additionally including a second electrode electrically isolated from the first electrode and extending generally orthogonally to the first electrode.

7. The apparatus of claim 6, wherein the first and second electrode form a part of a capacitive touch sensing system.

8. The apparatus of claim 1, additionally including a light guiding layer positioned adjacent the substrate, wherein the light guiding layer includes a first surface abutting the first surface of the substrate, wherein the at least one reflective facet extends beyond a plane of the first surface of the light guiding layer.

9. The apparatus of claim 8, additionally including a light source in optical communication with the light guiding layer and configured to emit light into the light guiding layer, wherein the reflective facet is configured to direct the emitted light out of the light guiding layer.

10. The apparatus of claim 8, additionally including a display disposed on the opposite side of the light guiding layer as the substrate.

11. The device of claim 10, additionally including:
a processor that is configured to communicate with the display, the processor being configured to process image data; and
a memory device that is configured to communicate with the processor.

12. The device of claim 11, additionally including:
a driver circuit configured to send at least one signal to the display; and
a controller configured to send at least a portion of the image data to the driver circuit.

13. The device of claim 11, additionally including an image source module configured to send the image data to the processor, wherein the image source module includes at least one of a receiver, transceiver, and transmitter.

14. A method of fabricating an apparatus, comprising:
forming a reflective layer over a substrate;
forming a masking layer over the reflective layer;
patterning the masking layer to form a first masking structure and a second masking structure, wherein the first masking structure is thicker than the second masking structure;
etching the reflective layer using a first etch to form portions of the reflective layer located under each of the first and second masking structures;
etching the first and second masking structures using a second etch, wherein the second etch removes the second masking structure without removing the first masking structure; and
etching the reflective layer using a third etch to form a reflective facet and an electrode, wherein the reflective facet is thicker than the electrode.

15. The method of claim 14, additionally comprising forming an etch leading layer over the reflective layer and prior to forming the masking layer, wherein the third etch etches the etch leading layer at a greater rate than the reflective layer.

16. The method of claim 14, additionally comprising forming an absorber layer over the substrate and a spacer layer over the absorber layer, wherein the reflective layer is formed over the absorber layer.

17. The method of claim 14, wherein the first masking structure and the second masking structure are laterally displaced from one another.

18. The method of claim 14, wherein the first masking structure and the second masking structure are not in contact with one another.

19. A device, comprising:
a reflective layer formed over a substrate;
an etch leading layer formed over the reflective layer;
a first masking structure formed over the etch leading layer; and
a second masking structure formed over the etch leading layer, wherein the second masking structure is separated from and laterally displaced from the first masking structure, and wherein the second masking structure has a thickness which is less than a thickness of the first masking structure.

20. The device of claim 19, additionally including a masking layer formed between the reflective layer and the substrate.

21. The device of claim 20, wherein the masking layer includes:
an optical absorber sublayer; and
a spacer sublayer disposed between the optical absorber sublayer and the reflective layer.

22. The device of claim 20, wherein the masking layer includes an opaque layer.

23. The device of claim 19, wherein the etch leading layer is etchable by an etchant at a first rate, and the reflective layer is etchable by the same etchant at a second rate, wherein the first rate is greater than the second rate.

* * * * *